US012701366B2

(12) United States Patent
Yamamoto

(10) Patent No.: US 12,701,366 B2
(45) Date of Patent: Aug. 4, 2026

(54) ULTRASONIC TRANSDUCER AND PARAMETRIC SPEAKER INCLUDING THE SAME

(71) Applicant: Murata Manufacturing Co., Ltd., Nagaokakyo (JP)

(72) Inventor: Hironari Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 200 days.

(21) Appl. No.: 18/829,640

(22) Filed: Sep. 10, 2024

(65) Prior Publication Data

US 2025/0016507 A1 Jan. 9, 2025

Related U.S. Application Data

(63) Continuation of application No. PCT/JP2024/005704, filed on Feb. 19, 2024.

(30) Foreign Application Priority Data

Jul. 5, 2023 (JP) ................................ 2023-110455

(51) Int. Cl.
*H04R 17/10* (2006.01)

(52) U.S. Cl.
CPC .......... *H04R 17/10* (2013.01); *H04R 2400/11* (2013.01)

(58) Field of Classification Search
CPC ................ H04R 17/10; H04R 2217/03; H04R 2307/027; H04R 2400/11; H04R 7/04;
(Continued)

(56) References Cited

U.S. PATENT DOCUMENTS

2013/0307633 A1* 11/2013 Onishi .................. H04R 17/00 331/155
2019/0081711 A1 3/2019 Yoshida
2024/0365071 A1* 10/2024 Yamamoto ........... H10N 30/204

FOREIGN PATENT DOCUMENTS

JP 2003047085 A 2/2003
JP 6333480 B1 5/2018
(Continued)

OTHER PUBLICATIONS

International Search Report in PCT/JP2024/005704, mailed May 14, 2024, 3 pages.
(Continued)

*Primary Examiner* — Carolyn R Edwards
*Assistant Examiner* — Julie X Dang
(74) *Attorney, Agent, or Firm* — Keating & Bennett, LLP

(57) ABSTRACT

A dimension in a longitudinal direction inside one or more frame bodies is equal to or greater than four times a dimension in a short direction orthogonal or substantially orthogonal to the longitudinal direction inside the one or more frame bodies and is greater than a minimum dimension in the longitudinal direction of one or more ultrasonic vibrators. An average length in the longitudinal direction of a gap between an edge on at least one side in the longitudinal direction of an inner circumferential surface of the one or more frame bodies and an edge on the at least one side in the longitudinal direction of a surface of the one or more ultrasonic vibrators on a frame body side is equal to or less than about 1.3 times a dimension in the short direction inside the one or more frame bodies.

20 Claims, 17 Drawing Sheets

(58) Field of Classification Search
CPC .. H04R 17/00; H10N 30/204; B06B 2201/55; B06B 1/0611; B06B 1/0603
USPC ................................ 381/150, 162, 190, 124
See application file for complete search history.

(56) References Cited

FOREIGN PATENT DOCUMENTS

| | | | |
|---|---|---|---|
| JP | 2020068482 | A | 4/2020 |
| WO | 2012090383 | A1 | 7/2012 |

OTHER PUBLICATIONS

Written Opinion in PCT/JP2024/005704, mailed May 14, 2024, 4 pages.

* cited by examiner

ULTRASONIC TRANSDUCER AND PARAMETRIC SPEAKER INCLUDING THE SAME

CROSS REFERENCE TO RELATED APPLICATIONS

This application is a Continuation Application of PCT Application No. PCT/JP2024/005704, filed on Feb. 19, 2024, and claims the benefit of priority to Japanese Patent Application No. 2023-110455, filed on Jul. 5, 2023. The entire contents of each application are hereby incorporated herein by reference.

BACKGROUND OF THE INVENTION

1. Field of the Invention

The present invention relates to ultrasonic transducers and parametric speakers including the same.

2. Description of the Related Art

As related art documents each disclosing a configuration of a super-directive acoustic device, there are Japanese Unexamined Patent Application Publication No. 2003-47085 and Japanese Patent No. 6333480. The super-directive acoustic device described in Japanese Unexamined Patent Application Publication No. 2003-47085 is configured by laying out a plurality of ultrasonic vibrators on one printed circuit board and arranging the ultrasonic vibrators so that an outer periphery thereof has a substantially circular shape. The plurality of ultrasonic vibrators are divided into two groups having different installation heights.

The super-directive acoustic device described in Japanese Patent No. 6333480 includes a first ultrasonic emitter and a second ultrasonic emitter. The second ultrasonic emitter is arranged on an axial center and in front of a radiation surface of the first ultrasonic emitter. A phase of a carrier signal emitted by the second ultrasonic emitter is opposite to a phase of a carrier signal contained in a signal emitted by the first ultrasonic emitter.

In the super-directive acoustic device described in Japanese Unexamined Patent Application Publication No. 2003-47085, the plurality of ultrasonic vibrators are arranged in the two groups having the different installation heights, and the configuration is complicated. In the super-directive acoustic device described in Japanese Patent No. 6333480, the second ultrasonic emitter is arranged outside the first ultrasonic emitter, and thus the device is increased in size.

SUMMARY OF THE INVENTION

Example embodiments of the present invention provide ultrasonic transducers each able to increase a sound pressure level while reducing power consumption with a simple and compact configuration, and parametric speakers including the same.

An ultrasonic transducer according to an example embodiment of the present invention includes a first diaphragm, one or more frame bodies, and one or more ultrasonic vibrators. The one or more frame bodies extend in a longitudinal direction and are bonded to the first diaphragm. The one or more ultrasonic vibrators are attached to the one or more frame bodies, respectively, and oppose the first diaphragm with a space in between. The first diaphragm resonates and vibrates in a direction orthogonal or substantially orthogonal to the first diaphragm in a phase opposite to a phase of the one or more ultrasonic vibrators. A dimension in the longitudinal direction inside the one or more frame bodies is equal to or greater than about four times a dimension in a short direction orthogonal or substantially orthogonal to the longitudinal direction inside the one or more frame bodies and is greater than a minimum dimension in the longitudinal direction of the one or more ultrasonic vibrators. An average length in the longitudinal direction of a gap between an edge on at least one side in the longitudinal direction of an inner circumferential surface of the one or more frame bodies and an edge on the at least one side in the longitudinal direction of a surface of the one or more ultrasonic vibrators on a frame body side is equal to or less than about 1.3 times the dimension in the short direction inside the one or more frame bodies.

According to example embodiments of the present invention, it is possible to increase a sound pressure level while reducing power consumption with a simple and compact configuration in an ultrasonic transducer.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
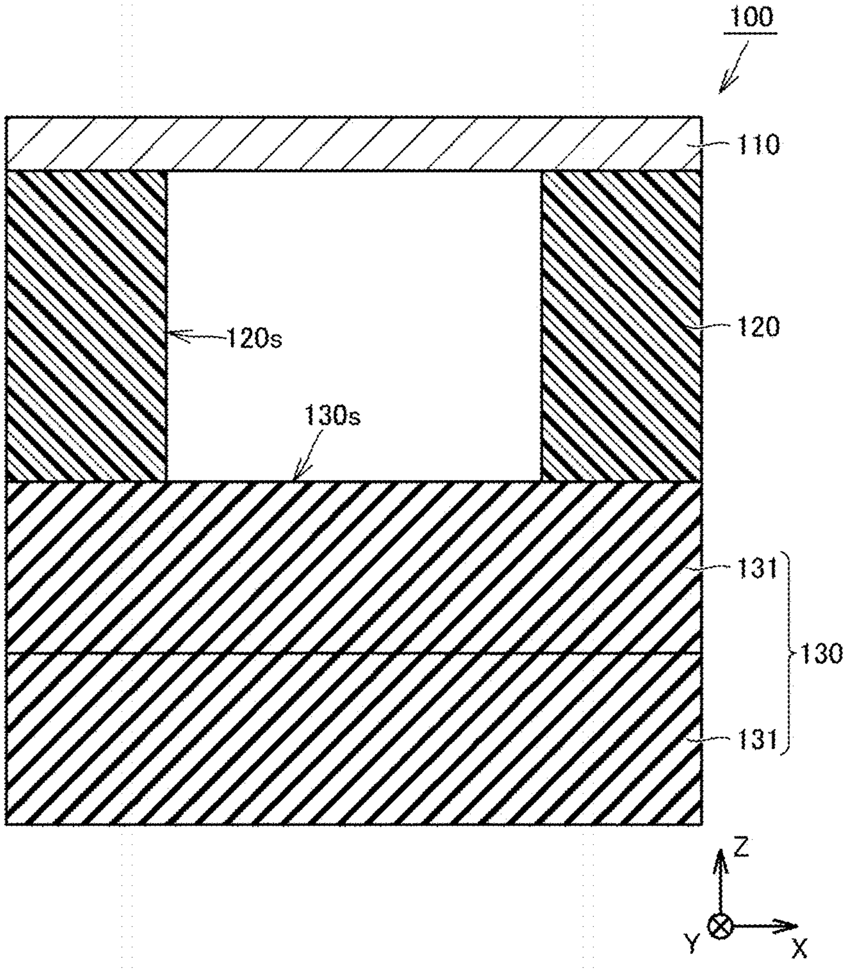
FIG. 1 is a longitudinal sectional view illustrating a configuration of an ultrasonic transducer according to Example Embodiment 1 of the present invention.

Hereinafter, ultrasonic transducers according to example embodiments of the present invention will be described in detail below with reference to the drawings. In the following description of the example embodiments, the same or corresponding portions in the drawings are denoted by the same reference numerals, and the description thereof will not be repeated. The present invention is applicable to applications requiring high-sound-pressure ultrasonic waves, such as ultrasonic transducers for parametric speakers, ultrasonic sensors, or non-contact haptics. In the following example embodiments, an ultrasonic transducer for a parametric speaker will be described as an example, but the use of the ultrasonic transducer is not limited thereto.

Example Embodiment 1

Figure 2:
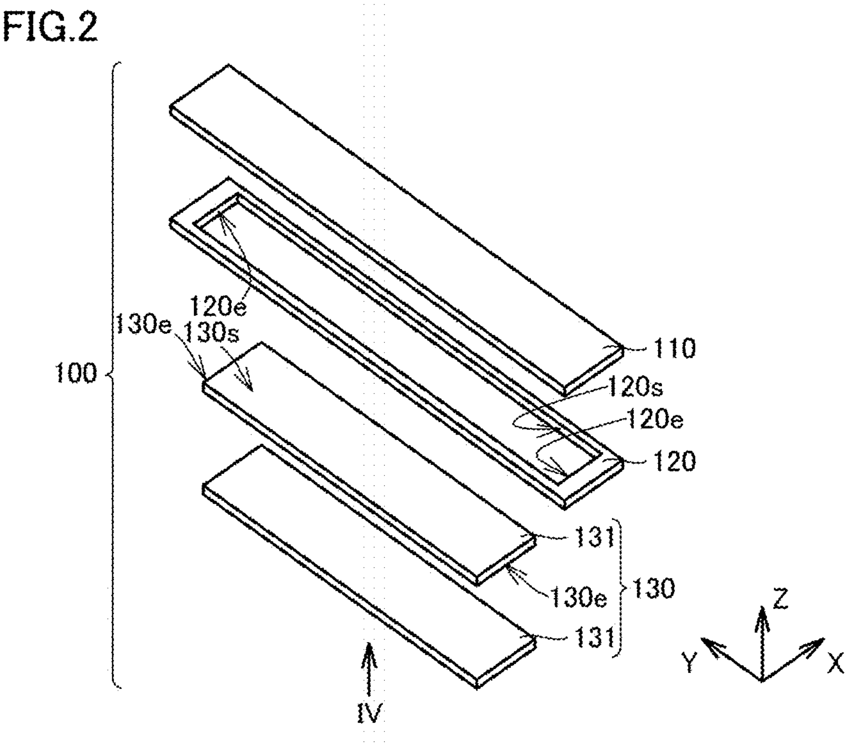
FIG. 2 is an exploded perspective view illustrating the configuration of the ultrasonic transducer according to Example Embodiment 1 of the present invention.

FIG. 1 is a longitudinal sectional view illustrating a configuration of an ultrasonic transducer according to Example Embodiment 1 of the present invention. FIG. 2 is an exploded perspective view illustrating the configuration of the ultrasonic transducer according to Example Embodiment 1 of the present invention. As illustrated in FIG. 1 and FIG. 2, an ultrasonic transducer 100 according to Example Embodiment 1 of the present invention preferably includes a first diaphragm 110, a frame body 120, and an ultrasonic vibrator 130.

The first diaphragm 110 has a flat plate shape. The first diaphragm 110 is made of an aluminum alloy such as, for example, duralumin containing aluminum, or metal such as stainless steel. In the present example embodiment, the first diaphragm 110 is made of stainless steel, for example. A thickness of the first diaphragm 110 is, for example, equal to or greater than about 0.1 mm and equal to or less than about 0.2 mm.

The frame body 120 has a rectangular or substantially rectangular annular shape. The frame body 120 has a short direction along a first direction (X-axis direction) and a longitudinal direction along a second direction (Y-axis direction). The frame body 120 extends in the second direction (Y-axis direction). An axial direction of the frame body 120 is aligned with a third direction (Z-axis direction). One end of the frame body 120 in the third direction (Z-axis direction) is bonded to the first diaphragm 110 by a bonding agent made of an epoxy resin or the like, for example.

The frame body 120 is preferably made of, for example, an aluminum alloy or metal such as stainless steel, glass epoxy, resin, or the like. From a viewpoint of reducing or preventing a change in characteristics of the ultrasonic transducer 100 due to a change in temperature, the frame body 120 is preferably made of metal, for example. On the other hand, from a viewpoint of lowering a frequency of ultrasonic waves transmitted or received by the ultrasonic transducer 100, and from a viewpoint of miniaturizing the ultrasonic transducer 100, the frame body 120 is preferably made of resin, for example. In the present example embodiment, the frame body 120 is made of stainless steel, for example. A thickness of the frame body 120 is, for example, equal to or greater than about 0.2 mm and equal to or less than about 0.8 mm.

Figure 3:
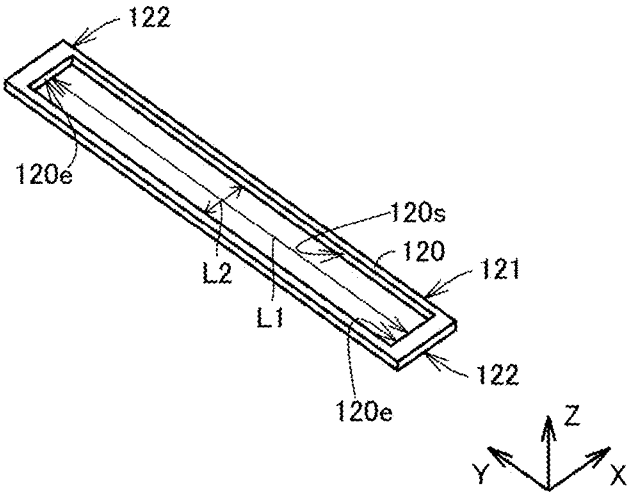
FIG. 3 is a perspective view illustrating a configuration of a frame body included in the ultrasonic transducer according to Example Embodiment 1 of the present invention.

FIG. 3 is a perspective view illustrating a configuration of the frame body included in the ultrasonic transducer according to Example Embodiment 1 of the present invention. As illustrated in FIG. 3, the frame body 120 includes a pair of long side portions 121 extending in the second direction (Y-axis direction) and a pair of short side portions 122 extending in the first direction (X-axis direction). The pair of long side portions 121 and the pair of short side portions 122 are continuous with each other to define an inner circumferential surface 120*s* of the frame body 120. An average interval between the short side portions 122 is, for example, equal to or greater than about four times a shortest interval between the long side portions 121. That is, a longitudinal dimension L1 in the second direction (Y-axis direction) inside the frame body 120 is, for example, equal to or greater than about four times a short dimension L2 in the first direction (X-axis direction) inside the frame body 120.

A corner portion interposed between the long side portion 121 and the short side portion 122 may be chamfered. Further, the short side portion 122 is not limited to be in a linear shape when viewed in the third direction (Z-axis direction), and may have an arc shape that is convex toward an inside of the frame body 120 or an arc shape that is convex toward an outside of the frame body 120.

A resonant frequency of the first diaphragm 110 can be adjusted by changing the short dimension L2 in the first direction (X-axis direction) inside the frame body 120. For example, when the resonant frequency of the first diaphragm 110 is set to be equal to or higher than about 100 kHz, the short dimension L2 is equal to or greater than about 1.5 mm and equal to or less than about 3 mm.

The longitudinal dimension L1 in the second direction (Y-axis direction) inside the frame body 120 is, for example, preferably equal to or greater than about four times the short dimension L2, and from a viewpoint of increasing a sound pressure level of ultrasonic waves transmitted by the ultrasonic transducer 100, the longitudinal dimension L1 is, for example, equal to or greater than about 20 mm.

Figure 4:
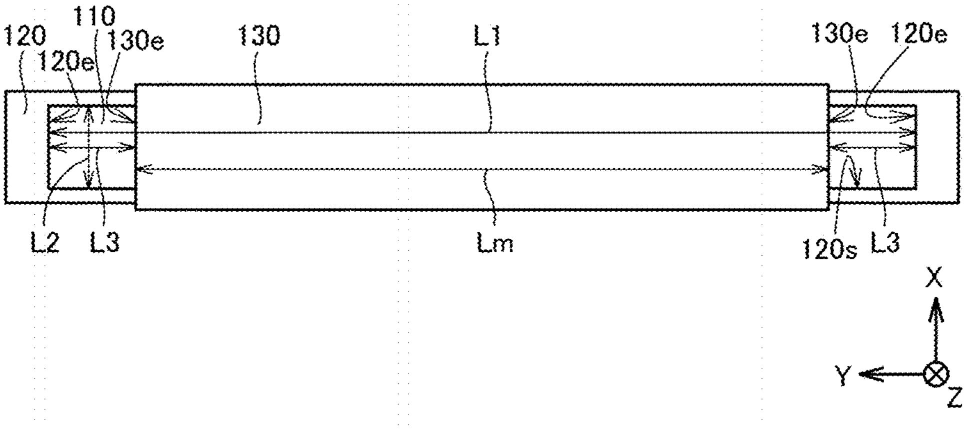
FIG. 4 is a diagram of the ultrasonic transducer illustrated in FIG. 2 as viewed in a direction of an arrow IV.

FIG. 4 is a diagram of the ultrasonic transducer illustrated in FIG. 2 as viewed in a direction of an arrow IV. As illustrated in FIG. 4, the ultrasonic vibrator 130 has a rectangular or substantially rectangular outer shape. The longitudinal dimension L1 in the second direction (Y-axis direction) inside the frame body 120 is greater than a minimum dimension Lm in the second direction (Y-axis direction) of the ultrasonic vibrator 130. Here, in a case where the ultrasonic vibrator 130 has a stacked structure in which a plurality of piezoelectric bodies are stacked, as will be described later, the minimum dimension Lm in the second direction (Y-axis direction) of the ultrasonic vibrator 130 is a minimum dimension in the second direction (Y-axis direction) of a piezoelectric body having a shortest length in the second direction (Y-axis direction) among the plurality of piezoelectric bodies. FIG. 4 illustrates the stacked structure in which the plurality of piezoelectric bodies are stacked without deviation in the second direction (Y-axis direction).

An average length L3 in the second direction (Y-axis direction) of a gap between an edge 120*e* on at least one side in the second direction (Y-axis direction) of the inner circumferential surface 120*s* of the frame body 120 and an edge 130*e* on the at least one side in the second direction (Y-axis direction) of a surface 130*s* of the ultrasonic vibrator 130 on a frame body 120 side illustrated in FIG. 2 is, for example, preferably equal to or less than about 1.3 times the short dimension L2 in the first direction (X-axis direction) inside the frame body 120.

In the present example embodiment, the average length L3 in the second direction (Y-axis direction) of the gap between the edge 120*e* on the one side in the second direction (Y-axis direction) of the inner circumferential surface 120*s* of the frame body 120 and the edge 130*e* on the one side in the second direction (Y-axis direction) of the surface 130*s* of the ultrasonic vibrator 130 on the frame body 120 side is, for example, equal to or less than about 1.3 times the short dimension L2 in the first direction (X-axis direction) inside the frame 120, the average length L3 in the second direction (Y-axis direction) of a gap between the edge 120*e* on another side in the second direction (Y-axis direction) of the inner circumferential surface 120*s* of the frame body 120 and the edge 130*e* on the other side in the second direction (Y-axis direction) of the surface 130*s* of the ultrasonic vibrator 130 on the frame body 120 side is, for example, equal to or less than about 1.3 times the short dimension L2 in the first direction (X-axis direction) inside the frame body 120.

Figure 5:
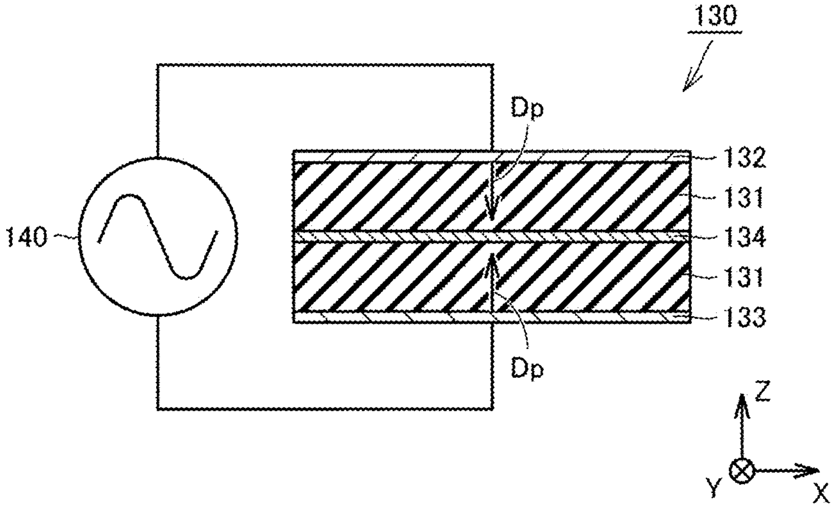
FIG. 5 is a sectional view illustrating a configuration of an ultrasonic vibrator included in the ultrasonic transducer according to Example Embodiment 1 of the present invention.

FIG. 5 is a sectional view illustrating a configuration of the ultrasonic vibrator included in the ultrasonic transducer according to Example Embodiment 1 of the present invention. As illustrated in FIG. 1, the ultrasonic vibrator 130 is attached to the frame body 120 and opposes the first diaphragm 110 with a space in between. Specifically, the ultrasonic vibrator 130 is attached to another end of each of the pair of long side portions 121 of the frame body 120 in the third direction (Z-axis direction), and opposes the first diaphragm 110 with an inner space of the frame body 120 in between.

As illustrated in FIG. 1, FIG. 2 and FIG. 5, the ultrasonic vibrator 130 is a piezoelectric element including a piezoelectric body 131. As illustrated in FIG. 5, in the present example embodiment, the ultrasonic vibrator 130 includes a stacked structure in which a plurality of the piezoelectric bodies 131 are stacked. Specifically, the ultrasonic vibrator 130 includes the two stacked piezoelectric bodies 131. Polarization directions Dp of the two piezoelectric bodies 131 are different from each other. Specifically, the polarization directions Dp of the two piezoelectric bodies 131 oppose each other in the third direction (Z-axis direction). The two piezoelectric bodies 131 are sandwiched between a first electrode 132 and a second electrode 133, and an intermediate electrode 134 is arranged between the two piezoelectric bodies 131. The first electrode 132 and the second electrode 133 are electrically connected to a processing circuit 140 capable of applying an AC voltage. The ultrasonic vibrator 130 is a so-called series-type bimorph piezoelectric vibrator. The piezoelectric body 131 has a rectangular parallelepiped shape. The total thickness of the two piezoelectric bodies 131 is, for example, equal to or greater than about 0.5 mm and equal to or less than about 0.85 mm. The piezoelectric body 131 is preferably, for example, a piezoelectric ceramic.

Figure 6:
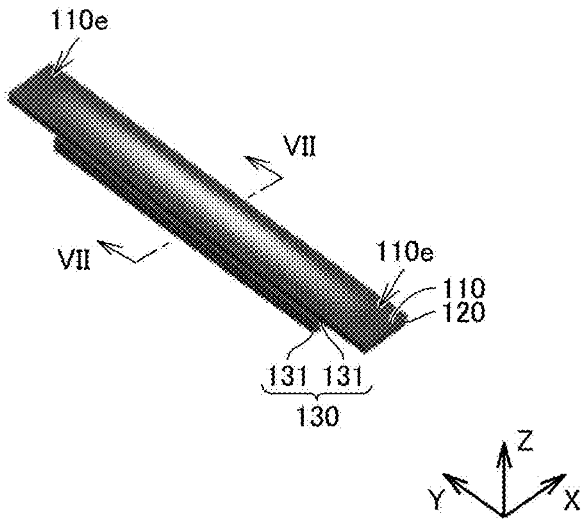
FIG. 6 is a perspective view showing a displacement state obtained by a simulation analysis using a finite element method when the ultrasonic transducer according to Example Embodiment 1 of the present invention is transmitting or receiving ultrasonic waves.
Figure 7:
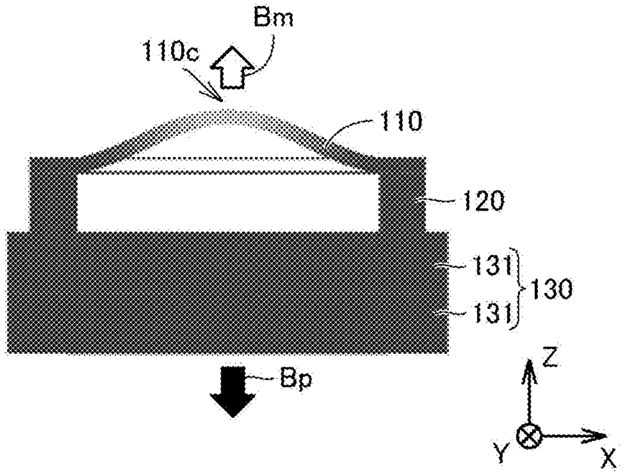
FIG. 7 is a sectional view of the ultrasonic transducer of FIG. 6 taken along line VII-VII as viewed in a direction of arrows.

FIG. 6 is a perspective view showing a displacement state obtained by a simulation analysis using a finite element method when the ultrasonic transducer according to Example Embodiment 1 of the present invention is transmitting or receiving ultrasonic waves. FIG. 7 is a sectional view of the ultrasonic transducer of FIG. 6 taken along line VII-VII as viewed in a direction of arrows. As simulation analysis conditions, for example, the thickness of the first diaphragm 110 was about 0.1 mm, the total thickness of the two piezoelectric bodies 131 was about 0.8 mm, the longitudinal dimension L1 inside the frame body 120 was about 20 mm, the short dimension L2 was about 2 mm, and the thickness of the frame body 120 in the third direction (Z-axis direction) was about 0.4 mm.

As illustrated in FIG. 6 and FIG. 7, in a vibration mode of the ultrasonic transducer 100 according to Example Embodiment 1 of the present invention, the first diaphragm 110 resonates and vibrates in a phase opposite to that of the ultrasonic vibrator 130 in the third direction (Z-axis direction) orthogonal to the first diaphragm 110. That is, as illustrated in FIG. 7, a displacement direction of a resonant vibration Bm of the first diaphragm 110, and a displacement direction of a resonant vibration Bp of the ultrasonic vibrator 130 are opposite to each other in the third direction (Z-axis direction). In the present example embodiment, for example, the resonant frequency of the first diaphragm 110 and a resonant frequency of the ultrasonic vibrator 130 are preferably equal to or higher than about 100 kHz.

In the first diaphragm 110, an intermediate portion 110*c* positioned at a middle in the longitudinal direction inside the frame body 120 becomes an antinode of the resonant vibration, and end portions 110*e* positioned at respective ends in the longitudinal direction inside the frame body 120 become nodes of the resonant vibration. That is, a portion of the first diaphragm 110 positioned above the inner space of the frame body 120 is a vibrating region that resonates and vibrates. A longitudinal dimension of the vibrating region of the first diaphragm 110 is equal to the longitudinal dimension L1 inside the frame body 120, and a short dimension of the vibrating region of the first diaphragm 110 is equal to the short dimension L2 inside the frame body 120.

Here, a relationship between the resonant frequency of the first diaphragm 110 and the longitudinal dimension L1 inside the frame body 120 will be described.

Figure 8:
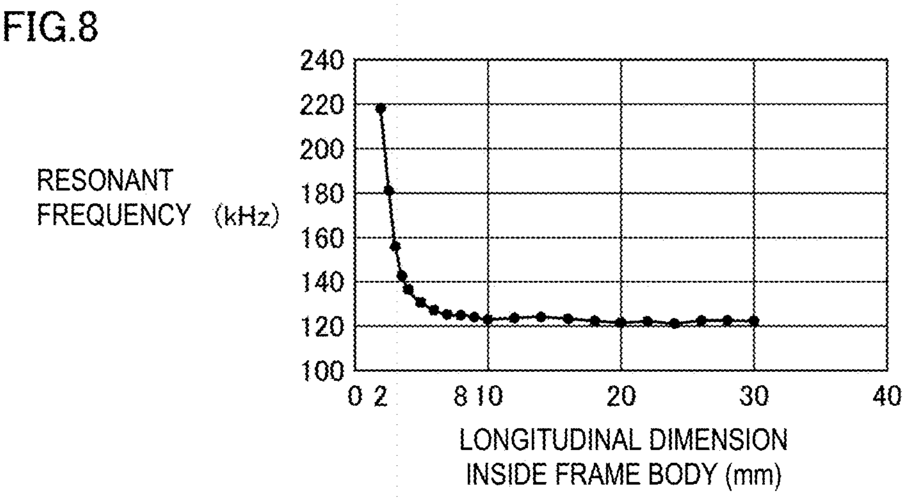
FIG. 8 is a graph obtained by a simulation analysis of a transition of a resonant frequency of a first diaphragm when a longitudinal dimension is changed while a short dimension inside the frame body is fixed, using a finite element method.

FIG. 8 is a graph obtained by a simulation analysis of a transition of the resonant frequency of the first diaphragm when the longitudinal dimension is changed while the short dimension inside the frame body is fixed, using a finite element method. In FIG. 8, a vertical axis represents the resonant frequency (kHz) of the first diaphragm 110, and a horizontal axis represents the longitudinal dimension L1 (mm) inside the frame body 120. As a simulation analysis condition, the short dimension L2 inside the frame body 120 was fixed to, for example, about 2 mm.

As shown in FIG. 8, for example, the resonant frequency of the first diaphragm 110 was about 220 kHz when the longitudinal dimension L1 inside the frame body 120 was about 2 mm, and the resonant frequency of the first diaphragm 110 was decreased to about 122 kHz when the longitudinal dimension L1 was increased to about 8 mm and thus the longitudinal dimension of the vibrating region of the first diaphragm 110 was increased. Thereafter, even when the longitudinal dimension L1 inside the frame body 120 was increased to be greater than about 8 mm and the longitudinal dimension of the vibrating region of the first diaphragm 110 was further increased, the resonant frequency of the first diaphragm 110 becomes substantially constant at about 122 kHz.

That is, the resonant frequency of the first diaphragm 110 is determined by acoustic velocity in the first diaphragm 110 and reflection of vibration with the frame body 120 as fixed ends, but influence of the short dimension L2 becomes dominant with respect to the reflection of vibration from when the longitudinal dimension L1 inside the frame body 120 exceeds about four times the short dimension L2, and the state of reflection of vibration does not change even when the longitudinal dimension L1 becomes further greater than about four times the short dimension L2.

Next, a result of a simulation analysis about a relationship between a sound pressure of an ultrasonic wave transmitted from the ultrasonic transducer 100 and the longitudinal dimension L1 inside the frame body 120 using a finite element method will be described.

Figure 9:
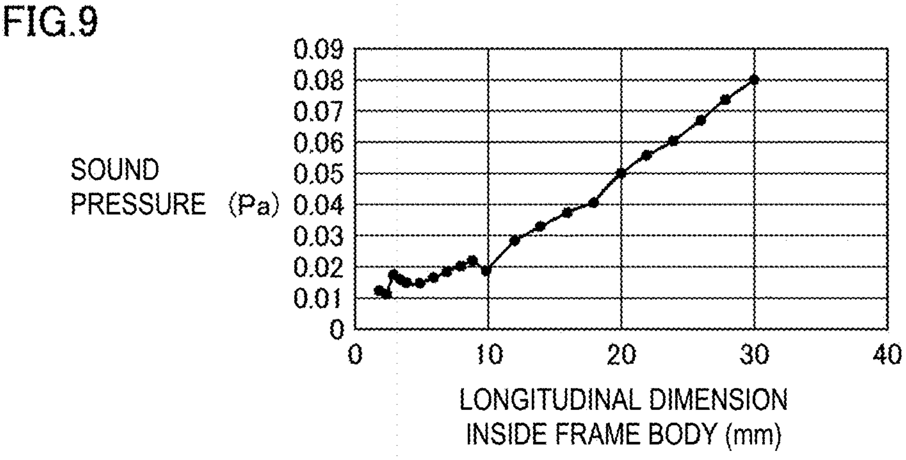
FIG. 9 is a graph obtained by a simulation analysis of a sound pressure transition of an ultrasonic wave transmitted from the ultrasonic transducer when the longitudinal dimension is changed while the short dimension inside the frame body is fixed, using a finite element method.

FIG. 9 is a graph obtained by a simulation analysis of a sound pressure transition of an ultrasonic wave transmitted from the ultrasonic transducer when the longitudinal dimension is changed while the short dimension inside the frame body is fixed, using a finite element method. In FIG. 9, a vertical axis represents the sound pressure (Pa) transmitted from the ultrasonic transducer 100, and a horizontal axis represents the longitudinal dimension L1 (mm) inside the frame body 120. As a simulation analysis condition, the short dimension L2 inside the frame body 120 was fixed to 2 mm, and the sound pressure (Pa) at a position separated by 30 cm in the third direction (Z-axis direction) from the first diaphragm 110 in front of the ultrasonic transducer 100 was calculated.

As shown in FIG. 9, the sound pressure of the ultrasonic wave transmitted from the ultrasonic transducer 100 was increased as the longitudinal dimension L1 inside the frame body 120 was increased. This means that even when the longitudinal dimension of the vibrating region of the first diaphragm 110 was increased, an entirety of the vibrating region of the first diaphragm 110 between both the end portions 110*e* vibrate. That is, an area of the vibrating region can be increased by an increment corresponding to an increased length of the vibrating region of the first diaphragm 110, and as a result, a change in pressure of the air due to the vibration of the first diaphragm 110 can be increased to obtain a high sound pressure.

As described above, in the ultrasonic transducer 100 according to the present example embodiment, the sound pressure can be increased while maintaining the resonant frequency substantially constant by increasing the longitudinal dimension of the vibrating region of the first diaphragm 110. In addition, since there are node points at respective end portions in the longitudinal direction, both the end portions can be supported or fixed, and thus the ultrasonic transducer 100 can be easily mounted.

Next, a result of a simulation analysis about a relationship between a sound pressure of an ultrasonic wave transmitted from the ultrasonic transducer and the minimum dimension Lm in the second direction (Y-axis direction) of the ultrasonic vibrator, using a finite element method will be described.

Figure 10:
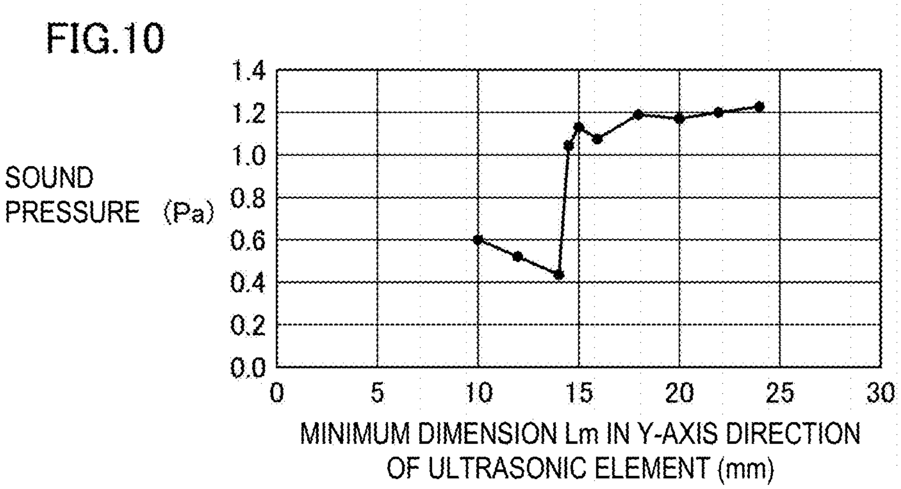
FIG. 10 is a graph obtained by a simulation analysis of a sound pressure transition of an ultrasonic wave transmitted from the ultrasonic transducer when a minimum dimension in a second direction (Y-axis direction) of the ultrasonic vibrator is changed, using a finite element method.

FIG. 10 is a graph obtained by a simulation analysis of a sound pressure transition of an ultrasonic wave transmitted from the ultrasonic transducer when the minimum dimension in the second direction (Y-axis direction) of the ultrasonic vibrator is changed, using a finite element method. In FIG. 10, a vertical axis represents the sound pressure (Pa) transmitted from the ultrasonic transducer, and a horizontal axis represents the minimum dimension Lm (mm) in the second direction (Y-axis direction) of the ultrasonic vibrator.

As simulation analysis conditions, for example, a dimension of an outer shape of the frame body 120 in the second direction (Y-axis direction) was about 24 mm, a dimension in the first direction (X-axis direction) was about 2.6 mm, the thickness of the frame body 120 in the third direction (Z-axis direction) was about 0.4 mm, the longitudinal dimension L1 inside the frame body 120 was about 20 mm, and the short dimension L2 was about 2 mm. A dimension of an outer shape of the first diaphragm 110 was equal or substantially equal to the dimension of the outer shape of the frame body 120, and, for example, the thickness of the first diaphragm 110 was about 0.1 mm. The ultrasonic vibrator 130 was a unimorph piezoelectric vibrator in which only one of the two stacked piezoelectric bodies 131 on the frame body 120 side was driven, a dimension of the piezoelectric body 131 in the first direction (X-axis direction) was about 2.9 mm, and the total thickness of the two piezoelectric bodies 131 was about 0.8 mm, for example. The two stacked piezoelectric bodies 131 were arranged so as to be positioned point-symmetrically with respect to a center of the frame body 120 as viewed from the third direction (Z-axis direction). A sound pressure (Pa) at a position separated by, for example, about 30 cm in the third direction (Z-axis direction) from the first diaphragm 110 in front of the ultrasonic transducer was calculated.

Figure 11:
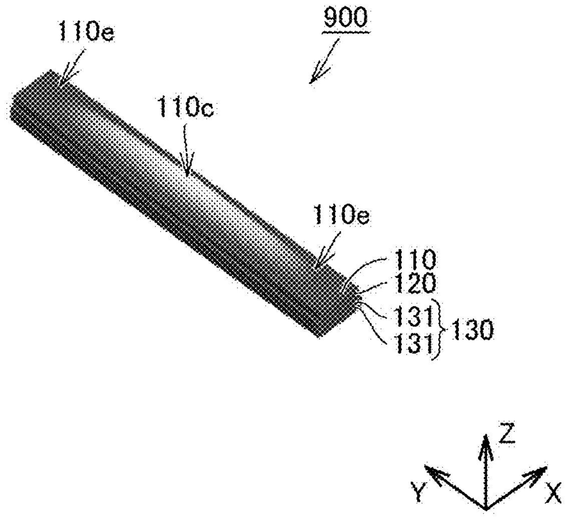
FIG. 11 is a perspective view showing a displacement state obtained by a simulation analysis using a finite element method when an ultrasonic transducer according to a first comparative example in which a minimum dimension in the second direction (Y-axis direction) of an ultrasonic vibrator is 20 mm is transmitting or receiving ultrasonic waves.
Figure 12:
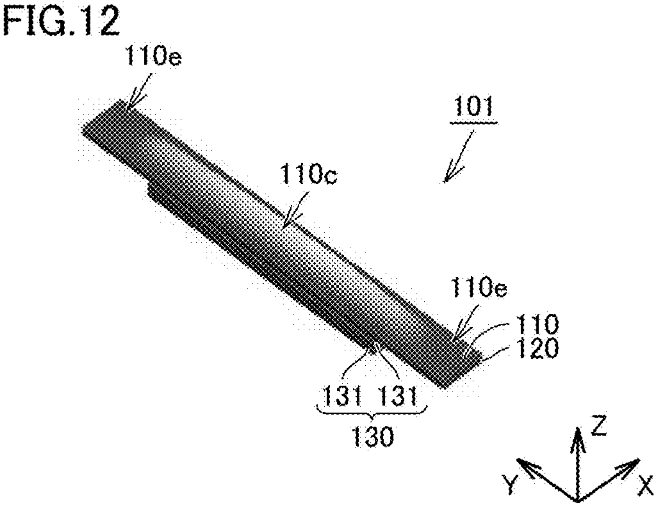
FIG. 12 is a perspective view showing a displacement state obtained by a simulation analysis using a finite element method when an ultrasonic transducer according to a first example in which a minimum dimension in the second direction (Y-axis direction) of an ultrasonic vibrator is 15 mm is transmitting or receiving ultrasonic waves.
Figure 13:
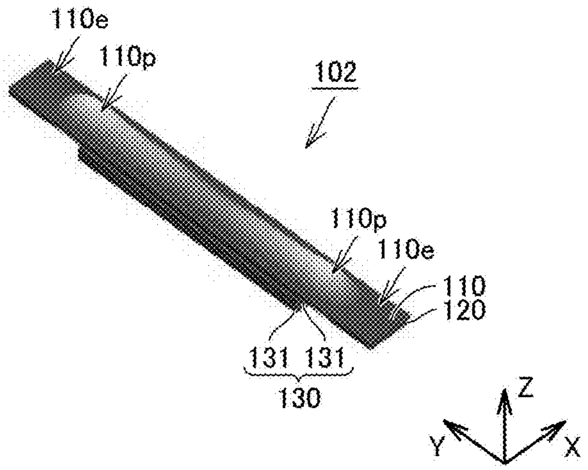
FIG. 13 is a perspective view showing a displacement state obtained by a simulation analysis using a finite element method when an ultrasonic transducer according to a second example in which a minimum dimension in the second direction (Y-axis direction) of an ultrasonic vibrator is 14.5 mm is transmitting or receiving ultrasonic waves.
Figure 14:
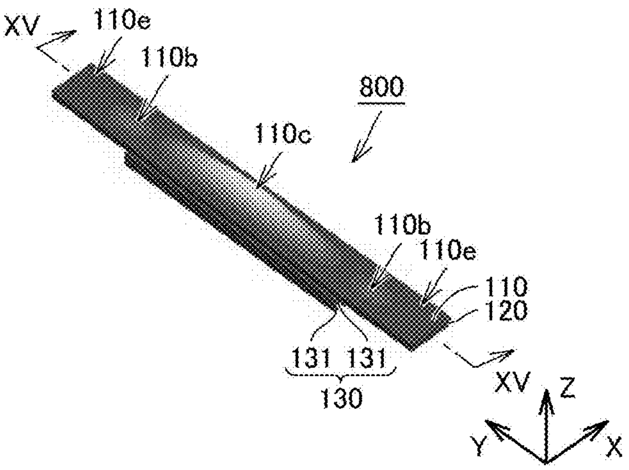
FIG. 14 is a perspective view showing a displacement state obtained by a simulation analysis using a finite element method when an ultrasonic transducer according to a second comparative example in which a minimum dimension in the second direction (Y-axis direction) of an ultrasonic vibrator is 14 mm is transmitting or receiving ultrasonic waves.
Figure 15:
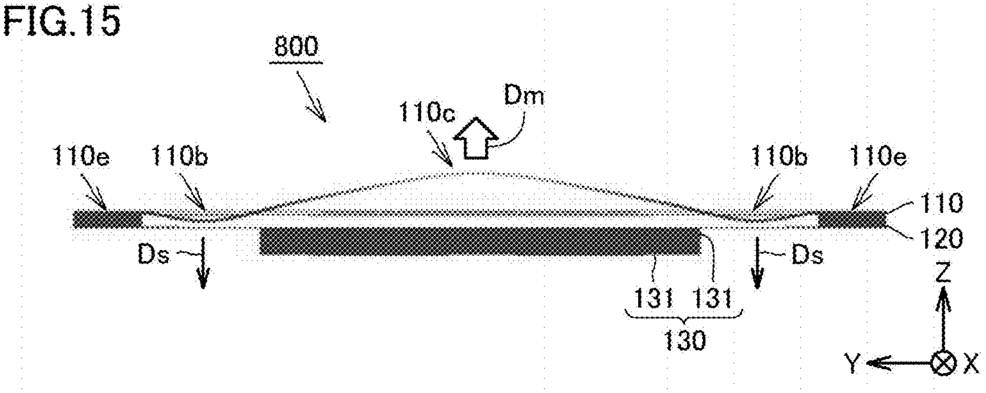
FIG. 15 is a sectional view of the ultrasonic transducer of FIG. 14 taken along line XV-XV as viewed in a direction of arrows.

FIG. 11 is a perspective view showing a displacement state obtained by a simulation analysis using a finite element method when an ultrasonic transducer according to a first comparative example in which the minimum dimension in the second direction (Y-axis direction) of the ultrasonic vibrator is about 20 mm is transmitting or receiving ultrasonic waves. FIG. 12 is a perspective view showing a displacement state obtained by a simulation analysis using a finite element method when an ultrasonic transducer according to a first example in which the minimum dimension in the second direction (Y-axis direction) of the ultrasonic vibrator is about 15 mm is transmitting or receiving ultrasonic waves. FIG. 13 is a perspective view showing a displacement state obtained by a simulation analysis using a finite element method when an ultrasonic transducer according to a second example in which the minimum dimension in the second direction (Y-axis direction) of the ultrasonic vibrator is about 14.5 mm is transmitting or receiving ultrasonic waves. FIG. 14 is a perspective view showing a displacement state obtained by a simulation analysis using a finite element method when an ultrasonic transducer according to a second comparative example in which the minimum dimension in the second direction (Y-axis direction) of the ultrasonic vibrator is about 14 mm is transmitting or receiving ultrasonic waves. FIG. 15 is a sectional view of the ultrasonic transducer of FIG. 14 taken along line XV-XV as viewed in a direction of arrows.

As shown in FIGS. 11 and 12, in each of an ultrasonic transducer 900 according to the first comparative example and an ultrasonic transducer 101 according to the first example in which the minimum dimension in the second direction (Y-axis direction) of the ultrasonic vibrator 130 is equal to or larger than about 15 mm, the first diaphragm 110 was vibrating in a tuning fork vibration mode in which the intermediate portion 110*c* of the first diaphragm 110 becomes an antinode of a resonant vibration. As shown in FIG. 13, in an ultrasonic transducer 102 according to the second example in which the minimum dimension in the second direction (Y-axis direction) of the ultrasonic vibrator 130 is about 14.5 mm, the first diaphragm 110 was vibrating in a vibration mode in which a large-displacement portion 110*p* having a largest displacement appears in a vicinity of each of both end potions in the longitudinal direction inside the frame body 120 in the first diaphragm 110. However, the two large-displacement portions 110*p* were vibrating in the same phase, and the first diaphragm 110 was vibrating in the same phase.

As shown in FIGS. 14 and 15, in an ultrasonic transducer 800 according to the second comparative example in which the minimum dimension in the second direction (Y-axis direction) of the ultrasonic vibrator 130 is about 14 mm, the first diaphragm 110 was vibrating in a vibration mode in which a reverse displacement portion 110*b* displaced in a displacement direction Ds opposite to a displacement direction Dm of the intermediate portion 110*c* appears in a vicinity of each of both the end portions in the longitudinal direction inside the frame body 120 in the first diaphragm 110. That is, in the first diaphragm 110, a vibration in a phase opposite to that of the intermediate portion 110*c* occurred in the vicinity of each of both the end portions in the longitudinal direction inside the frame body 120.

As a result, as shown in FIG. 10, a sound pressure of an ultrasonic wave transmitted from the ultrasonic transducer 800 according to the second comparative example in which the minimum dimension in the second direction (Y-axis direction) of the ultrasonic vibrator 130 is 14 mm was about half the sound pressure of the ultrasonic wave transmitted from the ultrasonic transducer 101 according to the first example in which the minimum dimension in the second direction (Y-axis direction) of the ultrasonic vibrator 130 is about 15 mm.

In the ultrasonic transducer 800 according to the second comparative example, the average length L3 in the second direction (Y-axis direction) of the gap between the edge 120*e* on the at least one side in the second direction (Y-axis direction) of the inner circumferential surface 120*s* of the frame body 120 and the edge 130*e* on the at least one side in the second direction (Y-axis direction) of the surface 130*s* of the ultrasonic vibrator 130 on the frame body 120 side is about 3 mm, and is about 1.5 times the short dimension L2 in the first direction (X-axis direction) inside the frame body 120. That is, when the average length L3 is about 1.5 times the short dimension L2 in the first direction (X-axis direction) inside the frame body 120, a vibration in an opposite phase occurs in the first diaphragm 110.

A simulation analysis using a finite element method has confirmed that a vibration in an opposite phase does not occur in the first diaphragm 110, when the average length L3 is equal to or less than about 1.3 times the short dimension L2 in the first direction (X-axis direction) inside the frame body 120, although there is a slight variation by changing the length dimension of the ultrasonic vibrator 130 in the second direction (Y-axis direction) and the short dimension L2 in the first direction (X-axis direction) inside the frame 120. That is, when the average length L3 is equal to or less than about 1.3 times the short dimension L2 in the first direction (X-axis direction) inside the frame body 120, power consumption can be reduced while maintaining the sound pressure of the ultrasonic waves transmitted from the ultrasonic transducer high.

Here, the power consumption of the ultrasonic transducer will be described. The piezoelectric body 131, particularly, the piezoelectric ceramic, which defines the ultrasonic vibrator 130, has a large dielectric constant and has electrical characteristics like a capacitor. An impedance of a capacitor is proportional to $1/\Omega C$, where $\Omega$ is each frequency of an alternating current and C is a capacitance. Therefore, when a frequency of voltage applied to the piezoelectric body 131 increases, an impedance of the piezoelectric body 131 decreases, and a consumption current is increased. On the other hand, when an area of the piezoelectric body 131 is reduced, capacitance is reduced, and thus the consumption current is reduced.

In the ultrasonic transducer 900 according to the first comparative example in which the minimum dimension in the second direction (Y-axis direction) of the ultrasonic vibrator 130 is about 20 mm, a length of the ultrasonic vibrator 130 in the second direction (Y-axis direction) and the longitudinal dimension L1 inside the frame body 120 are the same at about 20 mm, but as shown in FIG. 11, in the first diaphragm 110, the end portions 110*e* positioned on both the ends in the longitudinal direction inside the frame body 120 become nodes of a resonant vibration and hardly vibrate. That is, both the end portions of the ultrasonic vibrator 130 in the second direction (Y-axis direction) hardly vibrate and do not contribute.

Thus, in the present example embodiment, as illustrated in FIG. 4, the minimum dimension Lm in the second direction (Y-axis direction) of the ultrasonic vibrator 130 is less than the longitudinal dimension L1 in the second direction (Y-axis direction) inside the frame body 120 so that the gap is formed between the edge 120*e* on the at least one side of the inner circumferential surface 120*s* of the frame body 120 in the second direction (Y-axis direction) and the edge 130*e* on the at least one side of the surface 130*s* of the ultrasonic vibrator 130 on the frame body 120 side illustrated in FIG. 2 in the second direction (Y-axis direction). This makes it possible to eliminate both the end portions of the ultrasonic vibrator 130 in the second direction (Y-axis direction), which are the portions that do not contribute while consuming power as shown in FIG. 11, and to reduce the power consumption of f the ultrasonic vibrator 130 and to improve efficiency.

Additionally, the gap is provided and an internal space inside the frame body 120 and an external space outside the frame body 120 communicate with each other through the gap, thus, for example, when an adhesive to bond the first diaphragm 110 and the frame body 120 is heated and cured, a change in pressure in the internal space can be reduced, and an increase in internal stress in the ultrasonic transducer 100 can be reduced or prevented. When the first diaphragm 110 and the frame body 120 are bonded to each other with the adhesive, the average length L3 of the gap in the second direction (Y-axis direction) is, for example, preferably equal to or greater than about 0.2 mm in order to prevent the gap from being closed by the adhesive entering the gap applied to the long side portion 121 of the frame body 120. That is, the average length L3 in the second direction (Y-axis direction) of the gap is, for example, preferably equal to or greater than about 0.2 mm, and is equal to or less than about 1.3 times the short dimension L2 in the first direction (X-axis direction) inside the frame body 120.

Figure 16:
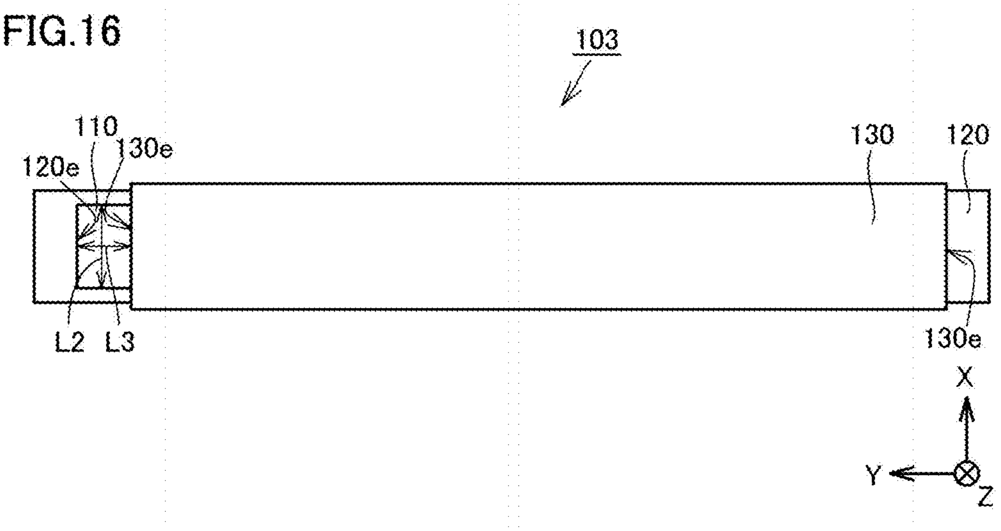
FIG. 16 is a diagram of an ultrasonic transducer according to a first modification of Example Embodiment 1 of the present invention as viewed from an ultrasonic vibrator side.

FIG. 16 is a diagram of an ultrasonic transducer according to a first modification of Example Embodiment 1 of the present invention as viewed from an ultrasonic vibrator side. As illustrated in FIG. 16, in an ultrasonic transducer 103 according to the first modification of Example Embodiment 1 of the present invention, the average length L3 in the second direction (Y-axis direction) of the gap between the edge 120*e* on the one side in the second direction (Y-axis direction) of the inner circumferential surface 120*s* of the frame body 120 and the edge 130*e* on the one side in the second direction (Y-axis direction) of the surface 130*s* of the ultrasonic vibrator 130 on the frame body 120 side is, for example, equal to or less than about 1.3 times the short dimension L2 in the first direction (X-axis direction) inside the frame 120, a gap is not formed between the edge 120*e* on the other side in the second direction (Y-axis direction) of the inner circumferential surface 120*s* of the frame body 120 and the edge 130*e* on the other side in the second direction (Y-axis direction) of the surface 130*s* of the ultrasonic vibrator 130 on the frame body 120 side. That is, only one of both the end portions of the ultrasonic vibrator 130 in the second direction (Y-axis direction), which are the portions that do not contribute while consuming power as shown in FIG. 11, may be eliminated.

Figure 17:
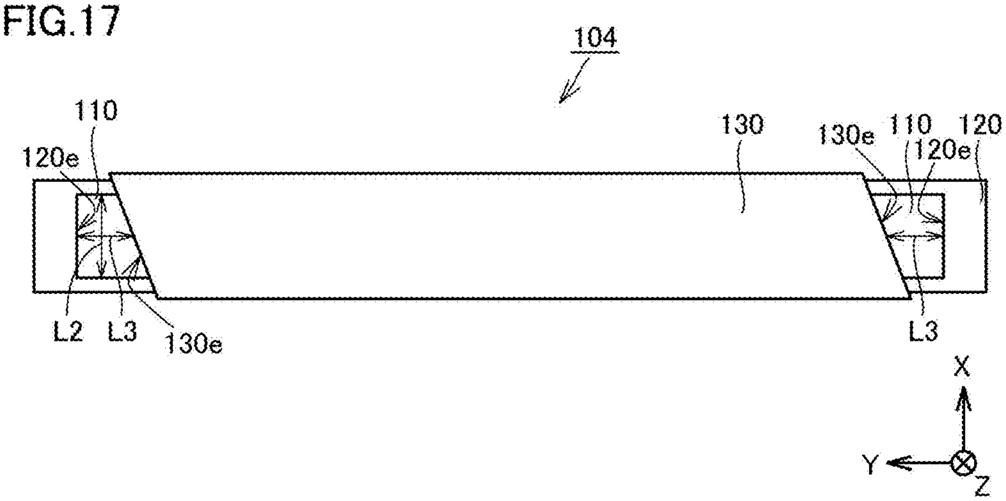
FIG. 17 is a diagram of an ultrasonic transducer according to a second modification of Example Embodiment 1 of the present invention as viewed from an ultrasonic vibrator side.

FIG. 17 is a diagram of an ultrasonic transducer according to a second modification of Example Embodiment 1 of the present invention as viewed from an ultrasonic vibrator side. As illustrated in FIG. 17, in an ultrasonic transducer 104 according to the second modification of Example Embodiment 1 of the present invention, the edge 130*e* on the at least one side in the second direction (Y-axis direction) of the surface 130*s* of the ultrasonic vibrator 130 on the frame body 120 side is not positioned in parallel to the edge 120*e* on the at least one side in the second direction (Y-axis direction) of the inner circumferential surface 120*s* of the frame 120 when viewed from the third direction (Z-axis direction). In such a case, the average length L3 in the second direction (Y-axis direction) of the gap between the edge 120*e* on the at least one side in the second direction (Y-axis direction) of the inner circumferential surface 120*s* of the frame body 120 and the edge 130*e* on the at least one side in the second direction (Y-axis direction) of the surface 130*s* of the ultrasonic vibrator 130 on the frame body 120 side illustrated in FIG. 2 is an average value of minimum lengths between the edge 120*e* and the edge 130*e* that vary depending on positions in the first direction (X-axis direction), and it is sufficient that the average length L3 is, for example, equal to or less than about 1.3 times the short dimension L2 in the first direction (X-axis direction) inside the frame body 120.

In the present example embodiment, the ultrasonic vibrator 130 is a series bimorph piezoelectric vibrator, but the ultrasonic vibrator 130 may be a piezoelectric vibrator of another type. Hereinafter, an ultrasonic vibrator of an ultrasonic transducer according to a modification of Example Embodiment 1 of the present invention will be described.

Figure 18:
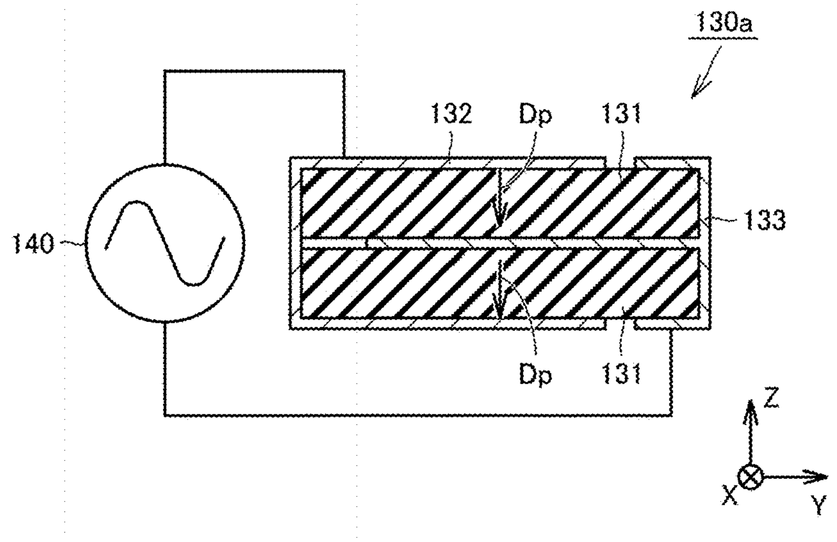
FIG. 18 is a sectional view illustrating a configuration of an ultrasonic vibrator according to a third modification of an example embodiment of the present invention.

FIG. 18 is a sectional view illustrating a configuration of an ultrasonic vibrator according to a third modification of an example embodiment of the present invention. As illustrated in FIG. 18, an ultrasonic vibrator 130*a* according to the third modification is a piezoelectric element including the two stacked piezoelectric bodies 131. The polarization directions Dp of the two piezoelectric bodies 131 are equal or substantially equal to each other. The ultrasonic vibrator 130*a* is a parallel bimorph piezoelectric vibrator.

Figure 19:
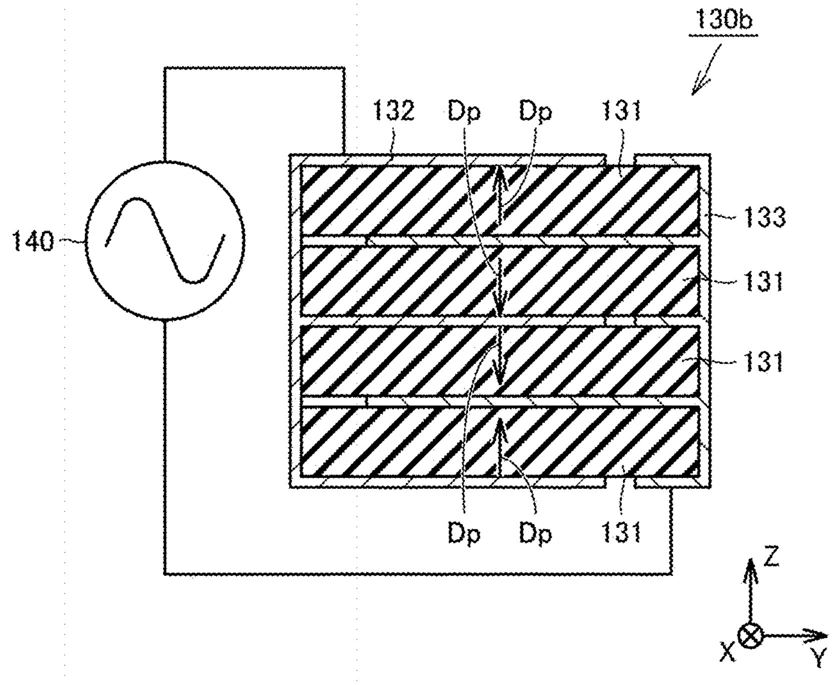
FIG. 19 is a sectional view illustrating a configuration of an ultrasonic vibrator according to a fourth modification of an example embodiment of the present invention.

FIG. 19 is a sectional view illustrating a configuration of an ultrasonic vibrator according to a fourth modification of an example embodiment of the present invention. As illustrated in FIG. 19, an ultrasonic vibrator 130*b* according to the fourth modification is a piezoelectric element including the four stacked piezoelectric bodies 131. The polarization directions Dp of the two piezoelectric bodies 131 positioned on outer sides among the four piezoelectric bodies 131 are oriented in one direction of the first direction (Z-axis direction), and the polarization directions Dp of the two piezoelectric bodies 131 positioned on inner sides among the four piezoelectric bodies 131 are oriented in another direction of the first direction (Z-axis direction). The ultrasonic vibrator 130*b* is a multimorph piezoelectric vibrator.

Figure 20:
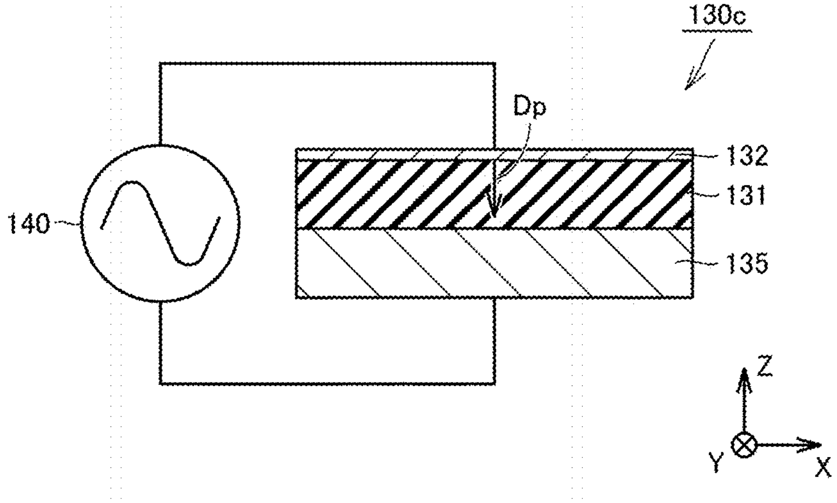
FIG. 20 is a sectional view illustrating a configuration of an ultrasonic vibrator according to a fifth modification of an example embodiment of the present invention.

FIG. 20 is a sectional view illustrating a configuration of an ultrasonic vibrator according to a fifth modification of an example embodiment of the present invention. As illustrated in FIG. 20, an ultrasonic vibrator 130*c* according to the fifth modification is a piezoelectric element including the one piezoelectric body 131. Specifically, the piezoelectric body 131 is sandwiched between the first electrode 132 and a second diaphragm 135 made of metal. The ultrasonic vibrator 130*c* is a unimorph piezoelectric vibrator.

Figure 21:
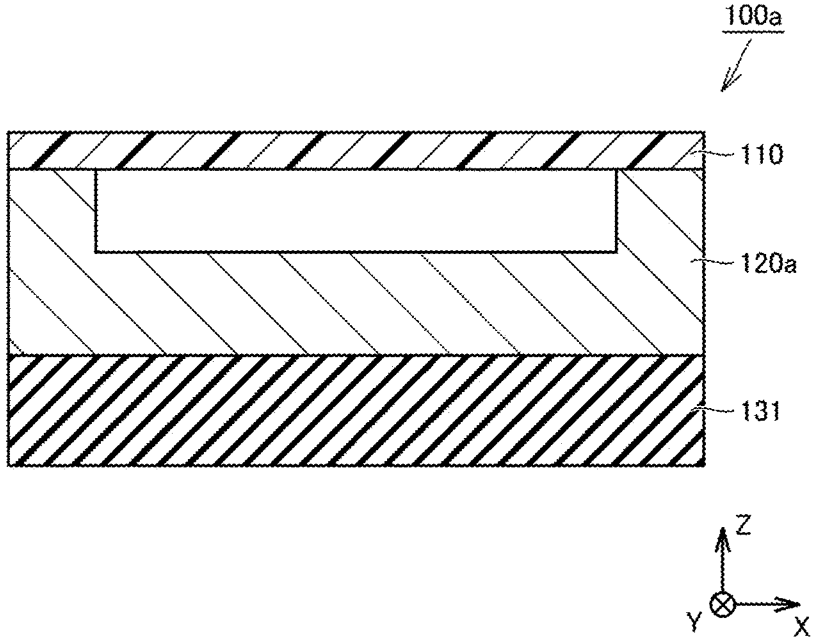
FIG. 21 is a longitudinal sectional view illustrating a configuration of an ultrasonic transducer according to a sixth modification of Example Embodiment 1 of the present invention.

FIG. 21 is a longitudinal sectional view illustrating a configuration of an ultrasonic transducer according to a sixth modification of Example Embodiment 1 of the present invention. As illustrated in FIG. 21, an ultrasonic transducer 100*a* according to the sixth modification of Example Embodiment 1 of the present invention includes the first diaphragm 110, a frame body 120*a* and the ultrasonic vibrator 130. The frame body 120*a* has a bottomed cylindrical shape. The frame body 120*a* is made of metal. The piezoelectric body 131 is affixed to an outer bottom surface of the frame body 120*a*, and an ultrasonic vibrator which is a unimorph piezoelectric vibrator is configured.

Figure 22:
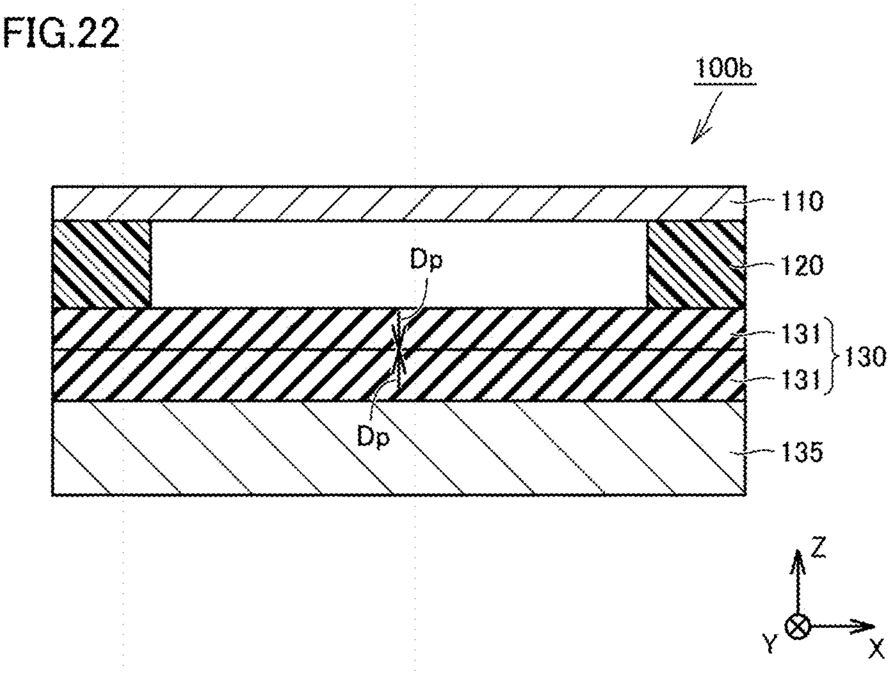
FIG. 22 is a longitudinal sectional view illustrating a configuration of an ultrasonic transducer according to a seventh modification of Example Embodiment 1 of the present invention.

FIG. 22 is a longitudinal sectional view illustrating a configuration of an ultrasonic transducer according to a seventh modification of Example Embodiment 1 of the present invention. As illustrated in FIG. 22, an ultrasonic transducer 100*b* according to the seventh modification of Example Embodiment 1 of the present invention includes the first diaphragm 110, the frame body 120 and the ultrasonic vibrator 130. The ultrasonic vibrator 130 is a piezoelectric element that includes the two stacked piezoelectric bodies 131. The polarization directions Dp of the two piezoelectric bodies 131 oppose each other in the third direction (Z-axis direction). Electric fields applied to the two piezoelectric bodies 131 also face in directions opposite to each other in the third direction (Z-axis direction), and thus an ultrasonic vibrator which is a unimorph piezoelectric vibrator in which the two piezoelectric bodies 131 perform bending vibration in the same manner is configured. The second diaphragm 135 is attached to one of the two piezoelectric bodies 131 which is positioned on a side opposite to the frame body 120 side.

The ultrasonic transducer 100 according to Example Embodiment 1 of the present invention includes the first diaphragm 110, the one or more frame bodies 120 and the one or more ultrasonic vibrators 130. The one or more frame bodies 120 extend in the longitudinal direction and are bonded to the first diaphragm 110. The one or more ultrasonic vibrators 130 are attached to the respective one or more frame bodies 120 and oppose the first diaphragm 110 with a space in between. The first diaphragm 110 resonates and vibrates in a direction orthogonal to the first diaphragm 110 in a phase opposite to that of the one or more ultrasonic vibrators 130. The dimension L1 in the longitudinal direction inside the one or more frame bodies 120 is, for example, equal to or greater than about four times the dimension L2 in the short direction orthogonal to the longitudinal direction inside the one or more frame bodies 120 and is greater than the minimum dimension Lm in the longitudinal direction of the one or more ultrasonic vibrators 130. The average length L3 in the longitudinal direction of the gap between the edge 120*e* on the at least one side in the longitudinal direction of the inner circumferential surface 120*s* of the one or more frame bodies 120 and the edge 130*e* on the at least one side in the longitudinal direction of the surface 130*s* of the one or more ultrasonic vibrators 130 on the frame body 120 side is, for example, equal to or less than about 1.3 times the dimension L2 in the short direction inside the one or more frame bodies 120. Accordingly, it is possible to increase a sound pressure level while reducing power consumption with a simple and compact configuration in the ultrasonic transducer.

In the ultrasonic transducer according to the fifth modification of Example Embodiment 1 of the present invention, the one or more ultrasonic vibrators 130 are each a piezoelectric element including the piezoelectric body 131. Thus, the ultrasonic transducer can have a simple and compact configuration.

In the ultrasonic transducer according to the fifth modification of Example Embodiment 1 of the present invention, the ultrasonic vibrator 130*c* is a unimorph piezoelectric vibrator, and the second diaphragm 135 is provided on a side of the piezoelectric body 131 opposite to the frame body side. This makes it possible to maintain the displacement of the first diaphragm 110 high while reducing power consumption, and to improve the efficiency of the ultrasonic transducer.

In a parametric speaker including the ultrasonic transducer 100 according to Example Embodiment 1 of the present invention, an ultrasonic wave emitted from the ultrasonic transducer 100 can be modulated by modulation driving of the ultrasonic transducer 100 to reproduce an audible sound. As a modulation method, there are an AM modulation method (amplitude modulation method) and an FM modulation method (frequency modulation method).

Example Embodiment 2

Hereinafter, an ultrasonic transducer according to Example Embodiment 2 of the present invention will be described with reference to the drawings. The ultrasonic transducer according to Example Embodiment 2 of the present invention is preferably different from the ultrasonic transducer according to Example Embodiment 1 of the present invention in that a plurality of ultrasonic vibrators are arranged in an array, and thus description of a configuration similar to that of the ultrasonic transducer according to Example Embodiment 1 of the present invention will not be repeated.

Figure 23:
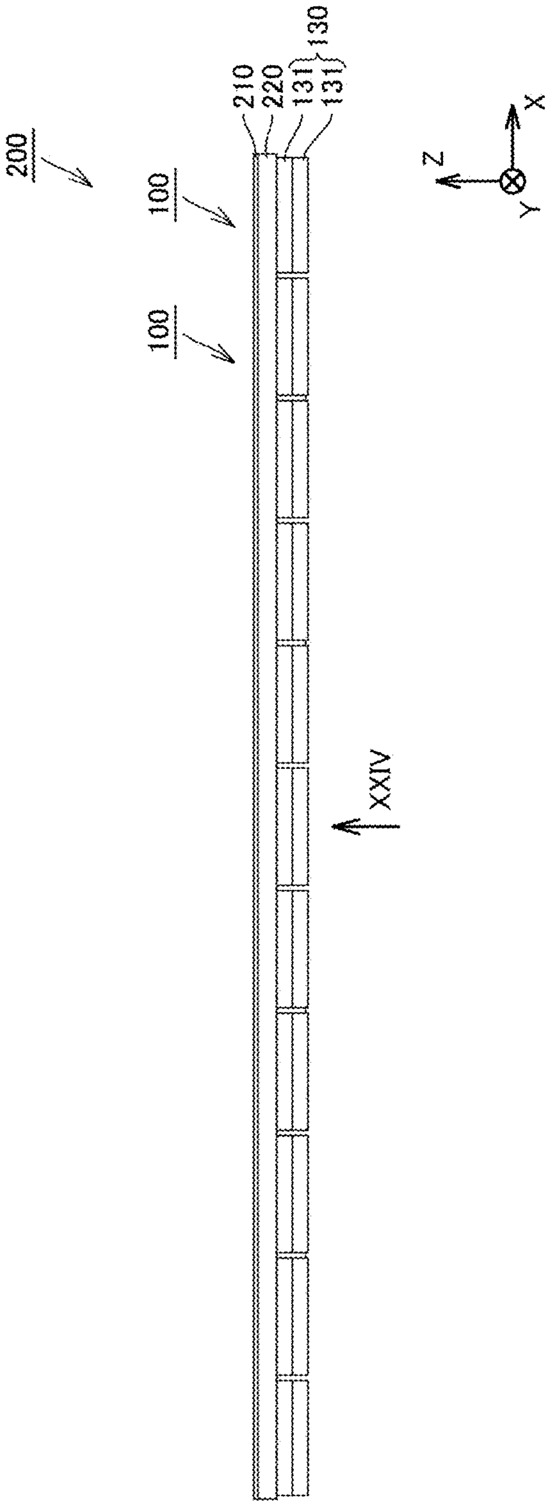
FIG. 23 is a side view illustrating a configuration of an ultrasonic transducer according to Example Embodiment 2 of the present invention.
Figure 24:
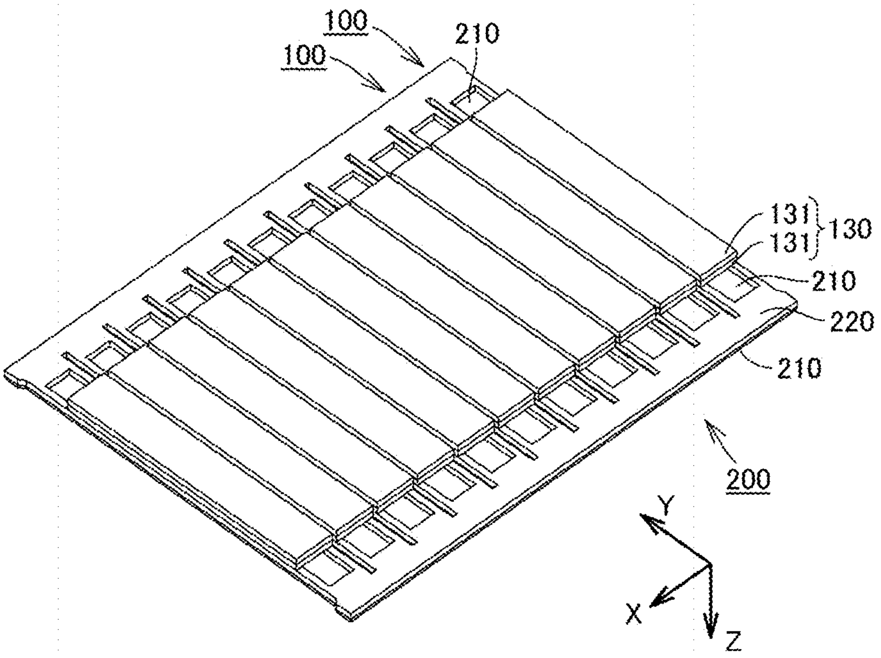
FIG. 24 is a rear view of the ultrasonic transducer illustrated in FIG. 23 as viewed in a direction of an arrow XXIV.

FIG. 23 is a side view illustrating a configuration of the ultrasonic transducer according to Example Embodiment 2 of the present invention. FIG. 24 is a rear view of the ultrasonic transducer illustrated in FIG. 23 as viewed in a direction of the arrow XXIV.

As illustrated in FIG. 23 and FIG. 24, in an ultrasonic transducer 200 according to Example Embodiment 2 of the present invention, the ultrasonic transducers 100 arranged side by side in an array in the first direction (X-axis direction) according to Example Embodiment 1 are integrally configured. The ultrasonic transducer 200 includes a first diaphragm 210, a plurality of frame bodies 220, and a plurality of the ultrasonic vibrators 130. The plurality of frame bodies 220 are bonded to the first diaphragm 210, and the plurality of ultrasonic vibrators 130 are bonded to the respective plurality of frame bodies 220.

Figure 25:
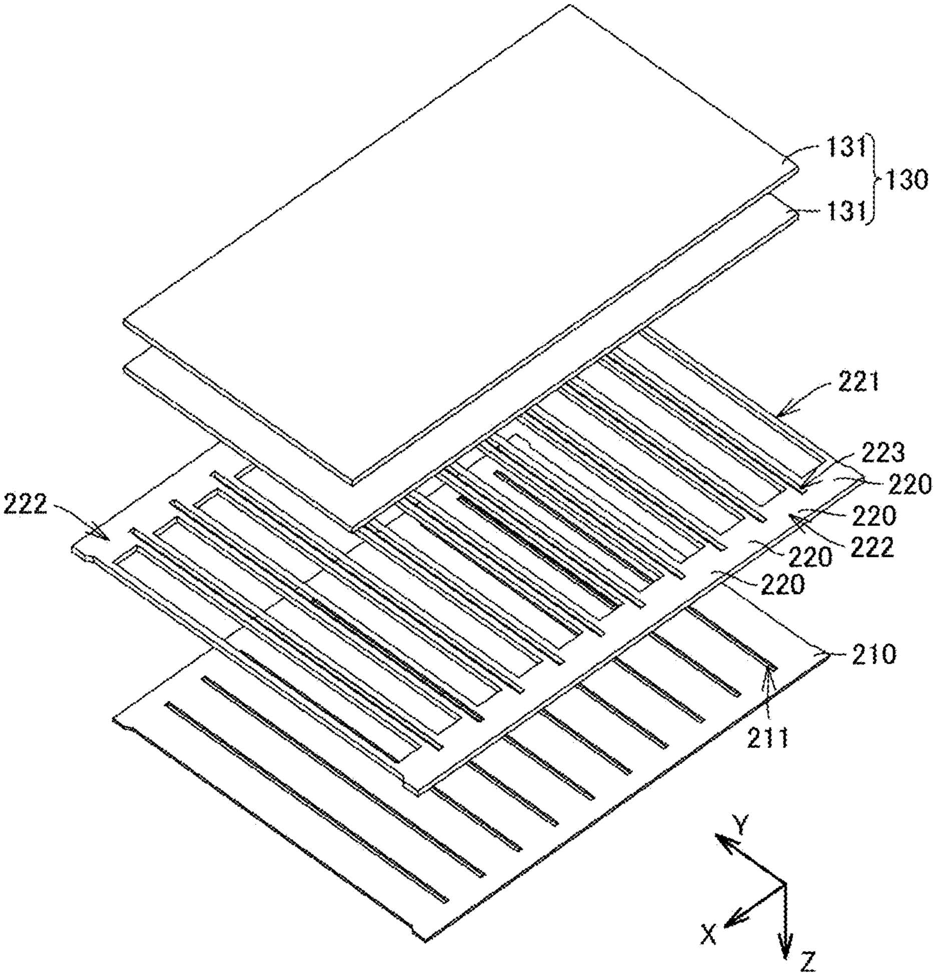
FIG. 25 is an exploded perspective view illustrating a stacked state in a step of stacking and bonding components each defining the ultrasonic transducer according to Example Embodiment 2 of the present invention.

Here, an example of a method of manufacturing the ultrasonic transducer 200 will be described. FIG. 25 is an exploded perspective view illustrating a stacked state in a step of stacking and bonding components each defining the ultrasonic transducer according to Example Embodiment 2 of the present invention.

As illustrated in FIG. 25, the first diaphragm 210 has a flat plate shape, and a plurality of slits 211 extending in the second direction (Y-axis direction) are formed, with intervals in the first direction (X-axis direction) interposed between the slits. The first diaphragm 210 is made of, for example, an aluminum alloy such as duralumin containing aluminum, or metal such as stainless steel. In the present example embodiment, the first diaphragm 210 is made of stainless steel, for example. The plurality of slits 211 are formed by, for example, etching, cutting, or the like.

Each of the plurality of frame bodies 220 preferably has a rectangular or substantially rectangular annular shape. Each of the plurality of frame bodies 220 has a short direction along the first direction (X-axis direction) and has a longitudinal direction along the second direction (Y-axis direction). Each of the plurality of frame bodies 220 extends in the second direction (the Y-axis direction). An axial direction of each of the plurality of frame bodies 220 is along the third direction (Z-axis direction). Each of the plurality of frame bodies 220 has a pair of long side portions 221 extending in the second direction (Y-axis direction) and a pair of short side portions 222 extending in the first direction (X-axis direction). A shortest interval between the long side portions 221 is, for example, equal to or greater than about four times a shortest interval between the short side portions 222.

The plurality of frame bodies 220 are arranged such that the frame bodies are aligned in the first direction (X-axis direction). A slit 223 is provided between the frame bodies 220 adjacent to each other in the first direction (X-axis direction). A plurality of the slits 223 are formed by etching, cutting, or the like. The long side portions 221 adjacent to each other in the frame bodies 220 adjacent to each other in the first direction (X-axis direction) are separated from each other by the slit 223.

The frame bodies 220 adjacent to each other in the first direction (X-axis direction) are connected to each other at the short side portions 222. That is, the frame bodies 220, of the plurality of frame bodies 220, adjacent to each other in the short direction are connected to each other at both end portions in the longitudinal direction.

Each of the plurality of frame bodies 220 is preferably made of an aluminum alloy or metal such as, for example, stainless steel, glass epoxy, resin, or the like. In the present example embodiment, the plurality of frame bodies 220 are formed of one thin plate, but the present invention is not limited thereto, and the short side portions 222 of the plurality of frame bodies 220 may be mutually bonded and integrally formed, where the plurality of frame bodies 220 are formed from respective thin plates.

In the present example embodiment, each of the plurality of ultrasonic vibrators 130 includes the two stacked piezoelectric bodies 131. As illustrated in FIG. 25, the two piezoelectric bodies 131 defining the plurality of ultrasonic vibrators 130 are stacked and bonded in a state of two thin plates.

Figure 26:
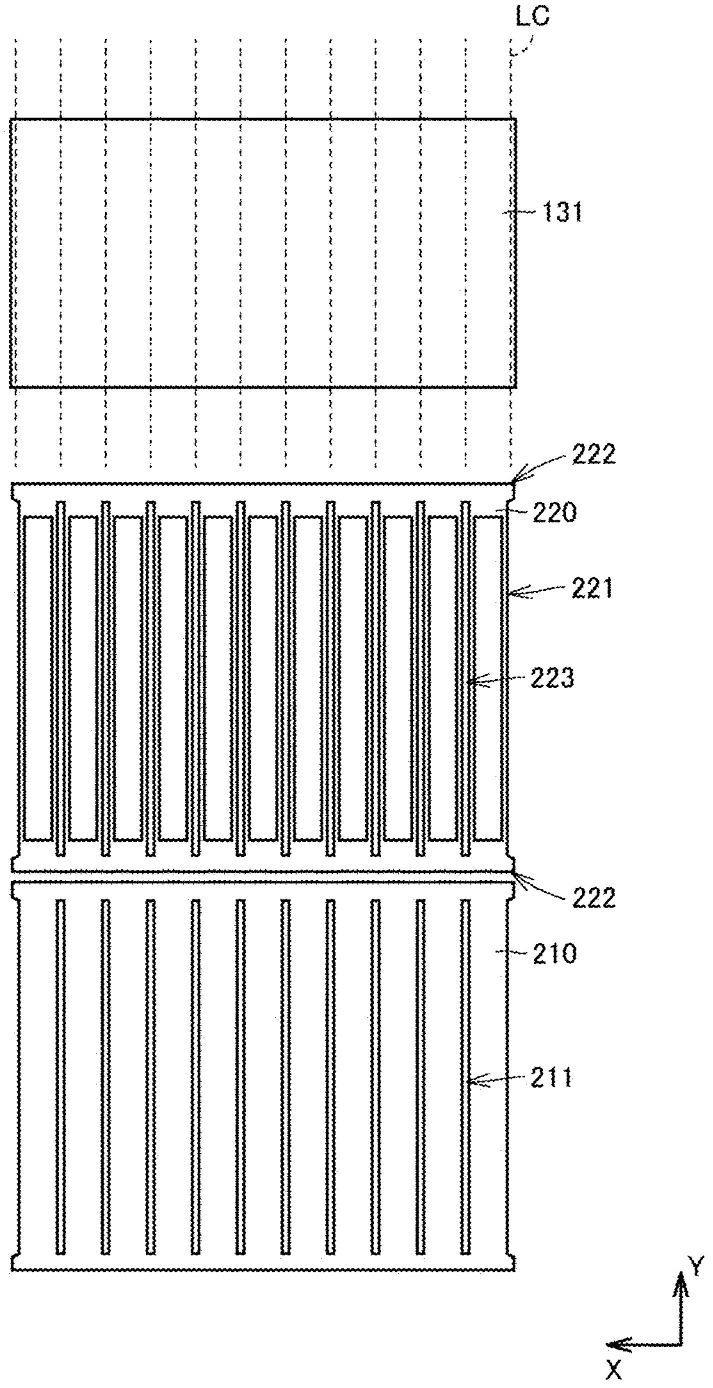
FIG. 26 is a plan view illustrating a positional relationship in the first direction (X-axis direction) in a step of cutting a piezoelectric body of the ultrasonic transducer according to Example Embodiment 2 of the present invention.

FIG. 26 is a plan view illustrating a positional relationship in the first direction (X-axis direction) in a step of cutting the piezoelectric body of the ultrasonic transducer according to Example Embodiment 2 of the present invention. In FIG. 26, only one piezoelectric body 131 is illustrated.

As illustrated in FIG. 26, the slit 211 and the slit 223 are arranged at the same position in the first direction (X-axis direction) so as to overlap each other in the third direction (Z-axis direction). The piezoelectric body 131 is cut and divided by, for example, a dicer or the like along a plurality of cut lines LC extending in the second direction (Y-axis direction) so as to overlap the slits 211 and the slits 223 in the third direction (Z-axis direction). As a result, the ultrasonic transducer 200 illustrated in FIG. 23 and FIG. 24 is formed.

Since the ultrasonic transducer 100 according to Example Embodiment 1 includes the node points at the respective end portions in the second direction (Y-axis direction) as the longitudinal direction, even when the ultrasonic transducer 200 according to Example Embodiment 2 is configured by connecting the ultrasonic transducers 100 according to Example Embodiment 1 to each other at both the end portions to be arrayed, a resonant vibration of each ultrasonic transducer 100 is not inhibited. Thus, a sound pressure level can be easily increased by increasing the number of ultrasonic transducers 100 defining the ultrasonic transducer 200 according to Example Embodiment 2.

In a parametric speaker including the ultrasonic transducer 200 according to Example Embodiment 2 of the present invention, an ultrasonic wave emitted from the ultrasonic transducer 200 can be modulated by modulation driving of the ultrasonic transducer 200 to reproduce an audible sound.

For example, in the parametric speaker including the ultrasonic transducer 200 according to the present example embodiment that transmits high-frequency ultrasonic waves at a frequency equal to or higher than about 100 kHz, it is possible to prevent sound from reaching an unnecessarily long distance and from leaking due to unnecessary reflection, and to reproduce an audible sound only in a limited space. In addition, in the ultrasonic transducer 200, since attenuation of an audible sound due to propagation distance can be increased without providing a configuration for transmitting a carrier wave of an opposite phase as in Japanese Patent No. 6333480, a simple and compact configuration can be achieved. Further, since an ultrasonic wave having a high frequency equal to or higher than about 100 kHz is outside an audible range of animals such as dogs and cats, influence on these animals can be suppressed.

For example, in order to attenuate an audible sound at a propagation distance of about 30 cm or longer, a Rayleigh length needs to be equal to or less than about 30 cm. A Rayleigh length R0 satisfies a relationship $R0=(k \times a^2)/2$. K is a wave number and a is a radius of a sound source. Thus, when acoustic velocity in air is about 340 m/s, a longitudinal dimension of a vibrating region of the first diaphragm 210 is equal to or less than about 36 mm when an ultrasonic wave has a frequency at about 100 kHz, the longitudinal dimension of the vibrating region of the first diaphragm 210 is equal to or less than about 29.4 mm when an ultrasonic wave has a frequency at about 150 kHz, and the longitudinal dimension of the vibrating region of the first diaphragm 210 is equal to or less than about 25.5 mm when an ultrasonic wave has a frequency at about 200 kHz. When a frequency of an ultrasonic wave is equal to or higher than about 100 kHz, the longitudinal dimension L1 is equal to or greater than about four times the short dimension L2 and equal to or less than about 24 times the short dimension L2.

The ultrasonic transducer 200 according to the present example embodiment can be used as a phased array system, for example.

In the ultrasonic transducer 200 according to Example Embodiment 2 of the present invention, the one or more frame bodies 220 are arranged so as to be aligned in the short direction and are bonded to the first diaphragm 210, and the frame bodies 220, of the one or more frame bodies 220, adjacent to each other in the short direction are connected to each other at both the end portions in the longitudinal direction. Thus, a sound pressure level can be easily increased.

Example Embodiment 3

Hereinafter, an ultrasonic transducer according to Example Embodiment 3 of the present invention will be described with reference to the drawings. The ultrasonic transducer according to Example Embodiment 3 of the present invention is preferably different from the ultrasonic transducer according to the fifth modification of Example Embodiment 1 of the present invention in that a portion of a surface of the piezoelectric body on a side opposite to the frame body side is exposed, and thus description of a configuration the same as or similar to that of the ultrasonic transducer according to the fifth modification of Example Embodiment 1 of the present invention will not be repeated.

Figure 27:
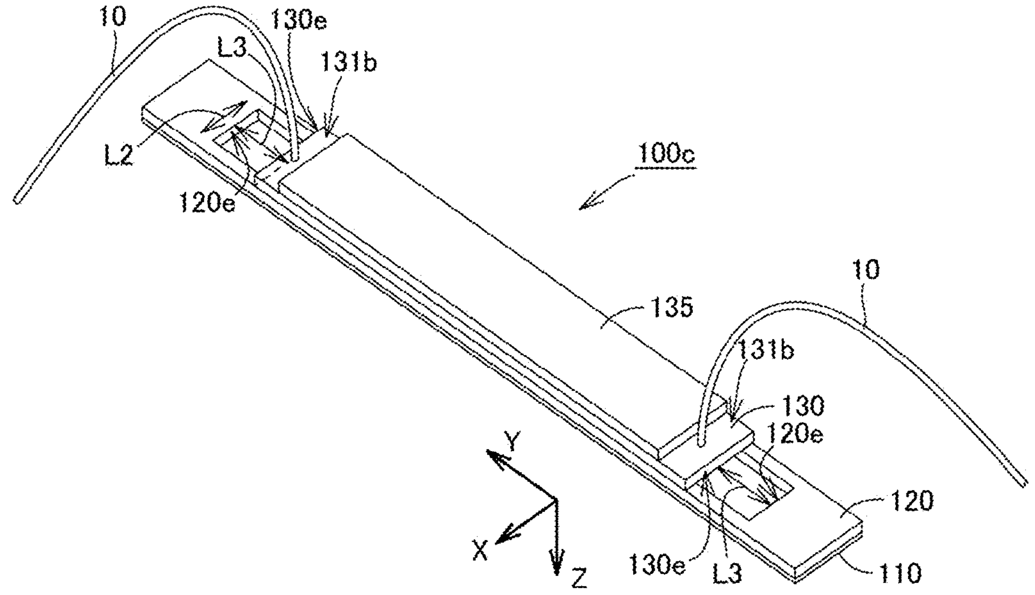
FIG. 27 is a perspective view of an ultrasonic transducer according to Example Embodiment 3 of the present invention as viewed from a second diaphragm side.

FIG. 27 is a perspective view of the ultrasonic transducer according to Example Embodiment 3 of the present invention as viewed from the second diaphragm side. As illustrated in FIG. 27, an ultrasonic transducer 100*c* according to Example Embodiment 3 of the present invention includes the first diaphragm 110, the frame body 120, the ultrasonic vibrator 130 and the second diaphragm 135. The ultrasonic vibrator 130 is a unimorph piezoelectric vibrator. The ultrasonic vibrator 130*c* is a piezoelectric element that includes at least one piezoelectric body 131. The average length L3 in the second direction (Y-axis direction) of the gap between the edge 120*e* on the at least one side in the second direction (Y-axis direction) of the inner circumferential surface of the frame body 120 and the edge 130*e* on the at least one side in the second direction (Y-axis direction) of the surface of the ultrasonic vibrator 130 on the frame body 120 side is, for example, equal to or less than about 1.3 times the short dimension L2 in the first direction (X-axis direction) inside the frame body 120. Accordingly, it is possible to increase a sound pressure level while reducing power consumption with a simple and compact configuration in the ultrasonic transducer 100*c*.

The second diaphragm 135 is provided on a side of the piezoelectric body 131 opposite to the frame body 120 side. A dimension in the second direction (Y-axis direction) of the second diaphragm 135 is smaller than the minimum dimension Lm in the second direction (Y-axis direction) of the ultrasonic vibrator 130. A part of a surface 131*b* of the piezoelectric body 131 on a side opposite to the frame body 120 side is not covered with the second diaphragm 135. Accordingly, it is possible to easily connect a wiring line 10 for supplying power to the piezoelectric body 131 to a part of the surface 131*b* of the piezoelectric body 131 on the side opposite to the frame body 120 side, which is not covered with the second diaphragm 135.

Figure 28:
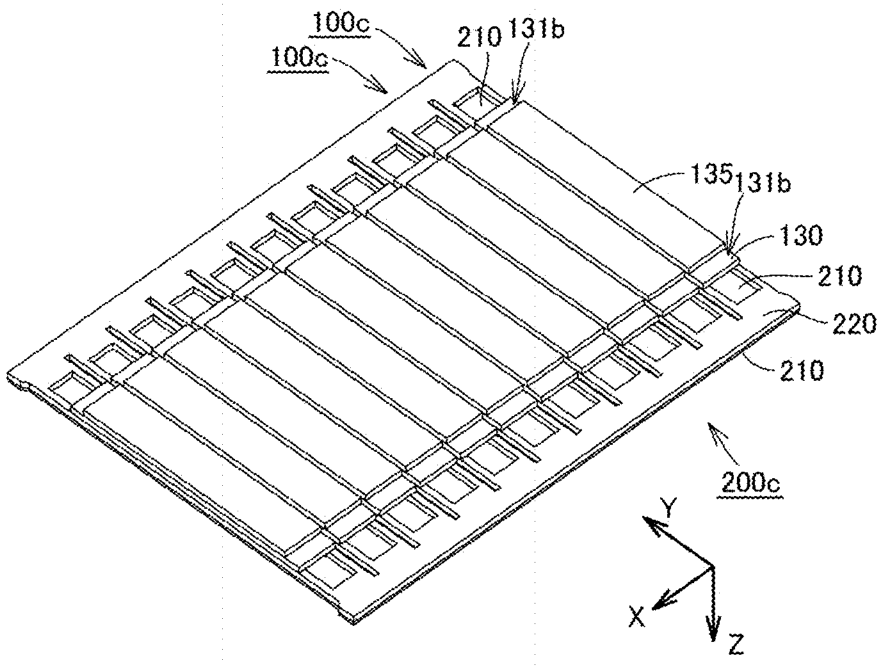
FIG. 28 is a perspective view of an ultrasonic transducer according to a first modification of Example Embodiment 3 of the present invention as viewed from a second diaphragm side.

FIG. 28 is a perspective view of an ultrasonic transducer according to a first modification of Example Embodiment 3 of the present invention as viewed from the second diaphragm side. As illustrated in FIG. 28, in an ultrasonic transducer 200*c* according to the first modification of Example Embodiment 3 of the present invention, the ultrasonic transducers 100*c* arranged side by side in an array in the first direction (X-axis direction) according to Example Embodiment 3 are integrally provided. The ultrasonic transducer 200*c* includes the first diaphragm 210, a plurality of the frame bodies 220, a plurality of the ultrasonic vibrators 130 and a plurality of the second diaphragms 135. The plurality of frame bodies 220 are bonded to the first diaphragm 210, the plurality of ultrasonic vibrators 130 are bonded to the plurality of frame bodies 220, respectively, and the plurality of second diaphragms 135 are bonded to the plurality of ultrasonic vibrators 130, respectively. A sound pressure level can be easily increased by increasing the number of ultrasonic transducers 100*c* defining the ultrasonic transducer 200*c* according to the first modification of Example Embodiment 3.

Example Embodiment 4

Hereinafter, an ultrasonic transducer according to Example Embodiment 4 of the present invention will be described with reference to the drawings. The ultrasonic transducer according to Example Embodiment 4 of the present invention is different from the ultrasonic transducer according to Example Embodiment 1 of the present invention in that a portion of the surface of the piezoelectric body on the side opposite to the frame body side is exposed, and thus description of a configuration similar to that of the ultrasonic transducer according to Example Embodiment 1 of the present invention will not be repeated.

Figure 29:
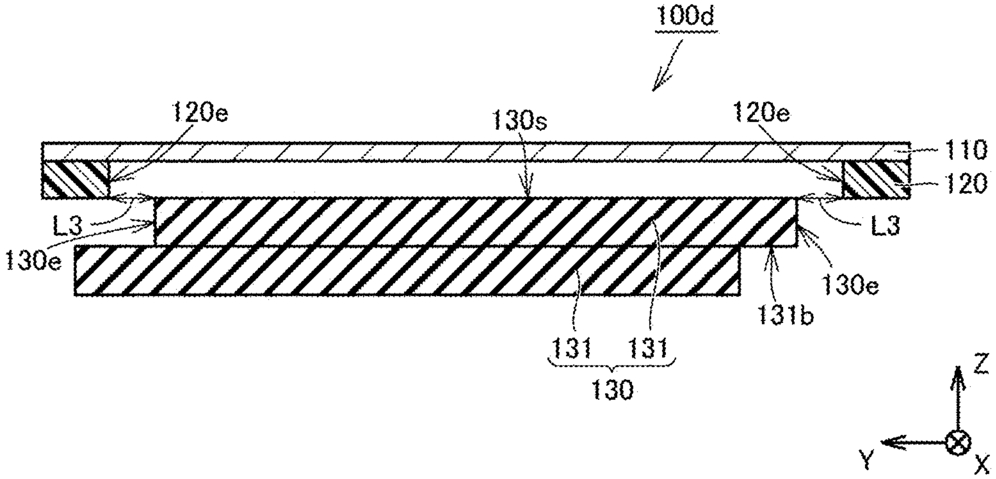
FIG. 29 is a sectional view illustrating a configuration of an ultrasonic transducer according to Example Embodiment 4 of the present invention.

FIG. 29 is a sectional view illustrating a configuration of the ultrasonic transducer according to Example Embodiment 4 of the present invention. As illustrated in FIG. 29, an ultrasonic transducer 100*d* according to Example Embodiment 4 of the present invention includes the first diaphragm 110, the frame body 120, and the ultrasonic vibrator 130. The ultrasonic vibrator 130 is a unimorph piezoelectric vibrator. The ultrasonic vibrator 130*c* includes a stacked structure in which a plurality of the piezoelectric bodies 131 are stacked.

The average length L3 in the second direction (Y-axis direction) of the gap between the edge 120*e* on the at least one side in the second direction (Y-axis direction) of the inner circumferential surface of the frame body 120 and the edge 130*e* on the at least one side in the second direction (Y-axis direction) of the surface 130*s* of the ultrasonic vibrator 130 on the frame body 120 side is, for example, equal to or less than about 1.3 times the short dimension L2 in the first direction (X-axis direction) inside the frame body 120. Accordingly, it is possible to increase a sound pressure level while reducing power consumption with a simple and compact configuration in the ultrasonic transducer 100*d*.

A portion of the surface 131*b* on the side opposite to the frame body 120 side of the piezoelectric body 131 positioned closest to the frame body 120 side in the stacked structure is not covered with at least one other piezoelectric body 131 other than the piezoelectric body 131 positioned closest to the frame body 120 side in the stacked structure. In detail, since the piezoelectric bodies 131 are arranged to be deviated in the second direction (Y-axis direction) in the stacked structure, a part of the surface 131*b* on the side opposite to the frame body 120 side of the piezoelectric body 131 positioned closest to the frame body 120 side is exposed without being covered with the other piezoelectric body 131. Accordingly, it is possible to easily connect the wiring line 10 for supplying power to the piezoelectric body 131 to a part of the surface 131*b* of the piezoelectric body 131 on the side opposite to the frame body 120 side, which is not covered with the other piezoelectric body 131. A dimension of the other piezoelectric body 131 in the second direction (Y-axis direction) may be larger than, smaller than, or the same as a dimension of the piezoelectric body 131 in the second direction (Y-axis direction) positioned closest to the frame body 120 side in the stacked structure.

In the description of the example embodiments described above, configurations that can be combined may be combined with each other.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic transducer, comprising:

a first diaphragm;

one or more frame bodies extending in a longitudinal direction and bonded to the first diaphragm; and one or more ultrasonic vibrators attached to the one or more frame bodies, respectively, and opposing the first diaphragm with a space in between; wherein the first diaphragm resonates and vibrates in a direction orthogonal or substantially orthogonal to the first diaphragm in a phase opposite to a phase of the one or more ultrasonic vibrators;

a dimension in the longitudinal direction inside the one or more frame bodies is equal to or greater than about four times a dimension in a short direction orthogonal or substantially orthogonal to the longitudinal direction inside the one or more frame bodies and is greater than a minimum dimension in the longitudinal direction of the one or more ultrasonic vibrators; and an average length in the longitudinal direction of a gap between an edge on at least one side in the longitudinal direction of an inner circumferential surface of the one or more frame bodies and an edge on the at least one side in the longitudinal direction of a surface of the one or more ultrasonic vibrators on a frame body side is equal to or less than about 1.3 times the dimension in the short direction inside the one or more frame bodies.

2. The ultrasonic transducer according to claim 1, wherein the one or more ultrasonic vibrators are each a piezoelectric element including a piezoelectric body.

3. The ultrasonic transducer according to claim 2, wherein the one or more ultrasonic vibrators each include a stacked structure in which a plurality of piezoelectric bodies included in the piezoelectric body are stacked; and a portion of a surface on a side opposite to the frame body side of a piezoelectric body positioned closest to the frame body side in the stacked structure is not covered with at least one other piezoelectric body other than the piezoelectric body positioned closest to the frame body side in the stacked structure.

4. The ultrasonic transducer according to claim 2, wherein the one or more ultrasonic vibrators are each a unimorph piezoelectric vibrator; and a second diaphragm is provided on a side of the piezoelectric body opposite to the frame body side.

5. The ultrasonic transducer according to claim 4, wherein a portion of a surface of the piezoelectric body on a side opposite to the frame body side is not covered with the second diaphragm.

6. The ultrasonic transducer according to claim 1, wherein the one or more frame bodies are aligned in the short direction and are bonded to the first diaphragm; and frame bodies, of the one or more frame bodies, adjacent to each other in the short direction are connected to each other at both end portions in the longitudinal direction.

7. A parametric speaker, comprising:

the ultrasonic transducer according to claim 1; wherein an audible sound is reproduced by modulation driving of the ultrasonic transducer.

8. The ultrasonic transducer according to claim 1, wherein a thickness of the first diaphragm is equal to or greater than about 0.1 mm and equal to or less than about 0.2 mm.

9. The ultrasonic transducer according to claim 1, wherein a thickness of the one or more frame bodies is equal to or greater than about 0.2 mm and equal to or less than about 0.8 mm.

10. The ultrasonic transducer according to claim 1, wherein a resonant frequency of the first diaphragm is set to be equal to or higher than about 100 KHz.

11. The ultrasonic transducer according to claim 1, wherein the one or more ultrasonic vibrators are each a bimorph piezoelectric vibrator.

12. The parametric speaker according to claim 7, wherein the one or more ultrasonic vibrators are each a piezoelectric element including a piezoelectric body.

13. The parametric speaker according to claim 12, wherein the one or more ultrasonic vibrators each include a stacked structure in which a plurality of piezoelectric bodies included in the piezoelectric body are stacked; and a portion of a surface on a side opposite to the frame body side of a piezoelectric body positioned closest to the frame body side in the stacked structure is not covered with at least one other piezoelectric body other than the piezoelectric body positioned closest to the frame body side in the stacked structure.

14. The parametric speaker according to claim 12, wherein the one or more ultrasonic vibrators are each a unimorph piezoelectric vibrator; and a second diaphragm is provided on a side of the piezoelectric body opposite to the frame body side.

15. The parametric speaker according to claim 14, wherein a portion of a surface of the piezoelectric body on a side opposite to the frame body side is not covered with the second diaphragm.

16. The parametric speaker according to claim 7, wherein the one or more frame bodies are aligned in the short direction and are bonded to the first diaphragm; and frame bodies, of the one or more frame bodies, adjacent to each other in the short direction are connected to each other at both end portions in the longitudinal direction.

17. The parametric speaker according to claim 7, wherein a thickness of the first diaphragm is equal to or greater than about 0.1 mm and equal to or less than about 0.2 mm.

18. The parametric speaker according to claim 7, wherein a thickness of the one or more frame bodies is equal to or greater than about 0.2 mm and equal to or less than about 0.8 mm.

19. The parametric speaker according to claim 7, wherein a resonant frequency of the first diaphragm is set to be equal to or higher than about 100 KHz.

20. The parametric speaker according to claim 7, wherein the one or more ultrasonic vibrators are each a bimorph piezoelectric vibrator.

* * * * *